(12) United States Patent
Drazin

(10) Patent No.: US 7,908,636 B2
(45) Date of Patent: Mar. 15, 2011

(54) MEMORY CARD HANDLING FOR ENHANCING INTERACTIVE TELEVISION SERVICES

(75) Inventor: Jonathan Peter Vincent Drazin, London (GB)

(73) Assignee: Electra Entertainment Limited, London (GB)

( * ) Notice: Subject to any disclaimer, the term of this patent is extended or adjusted under 35 U.S.C. 154(b) by 328 days.

(21) Appl. No.: 11/776,965

(22) Filed: Jul. 12, 2007

(65) Prior Publication Data

US 2008/0028434 A1  Jan. 31, 2008

Related U.S. Application Data

(63) Continuation of application No. PCT/GB2006/000083, filed on Jan. 11, 2006.

(30) Foreign Application Priority Data

Jan. 12, 2005 (GB) .................................. 0500579.8

(51) Int. Cl.
H04N 7/173 (2006.01)
(52) U.S. Cl. ........... 725/134; 725/50; 725/132; 725/141; 725/152; 725/115; 711/162
(58) Field of Classification Search .......... 725/132–134, 725/140, 152, 49
See application file for complete search history.

(56) References Cited

U.S. PATENT DOCUMENTS

| | | | |
|---|---|---|---|
| 6,029,046 A * | 2/2000 | Khan et al. ....................... | 725/31 |
| 6,052,764 A * | 4/2000 | Mogul ........................... | 711/162 |
| 6,760,918 B2 * | 7/2004 | Rodriguez et al. ............ | 725/134 |
| 2002/0047938 A1 | 4/2002 | Inoue et al. | |
| 2003/0208763 A1 | 11/2003 | McElhatten et al. | |
| 2004/0078807 A1* | 4/2004 | Fries et al. ....................... | 725/14 |
| 2005/0120373 A1* | 6/2005 | Thomas et al. ................. | 725/58 |

FOREIGN PATENT DOCUMENTS

EP         1 113 668        7/2001
WO    WO 2004/105293    12/2004

OTHER PUBLICATIONS

Written Opinion for International Application No. PCT/GB2006/000083.
International Search Report for International Application No. PCT/GB2006/000083.

* cited by examiner

Primary Examiner — Andrew Y Koenig
Assistant Examiner — Anthony Bantamoi
(74) Attorney, Agent, or Firm — Alston & Bird LLP

(57) ABSTRACT

An interactive television system is operable to receive television signals and data for implementing interactive television services. At least some of the interactive television data received is stored on a removable, non-volatile memory, such as a memory card or stick. To allow a user to access services, the system is operable to generate a user interface. Services that are available via information stored on a memory card are marked.

32 Claims, 18 Drawing Sheets

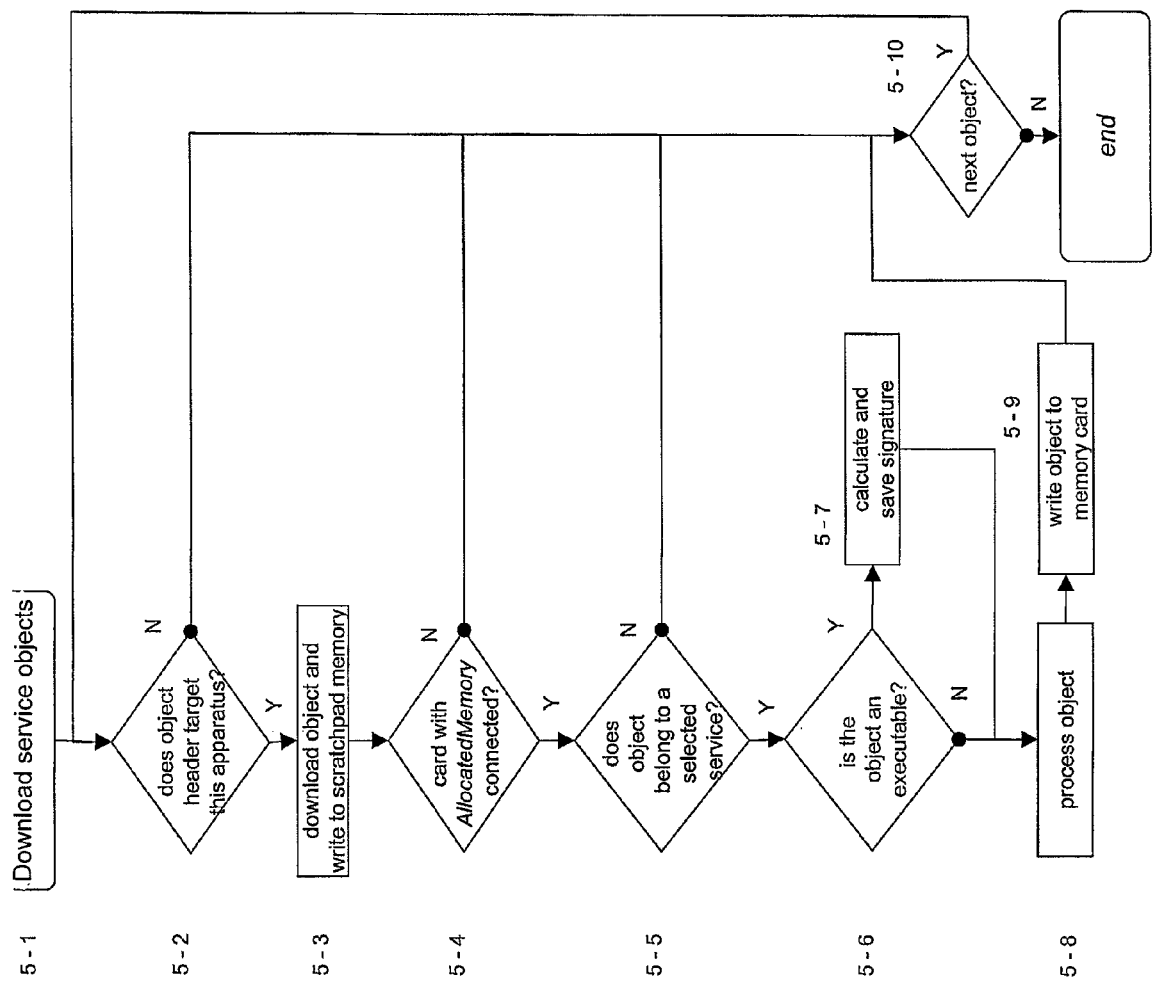

MEMORY CARD HANDLING FOR ENHANCING INTERACTIVE TELEVISION SERVICES

CROSS-REFERENCE TO RELATED APPLICATIONS

This application is a continuation of, and claims the benefit of the priority of, International Application No. PCT/GB2006/000083, filed Jan. 11, 2006, which international application is hereby incorporated herein in its entirety by this reference. This application furthermore claims the benefit of the priority of United Kingdom (GB) Patent Application No. 0500579.8, filed Jan. 12, 2005, the priority of which United Kingdom patent application is claimed by said international application.

BACKGROUND OF THE INVENTION

The present invention relates to a television (TV) apparatus that uses removable memory cards to enhance the quality and availability of interactive television services.

Interactive services to digital television and set-top-box apparatus have been in operation for a number of years. These generally allocate volatile memory (i.e. where memory contents are lost when power is withdrawn), usually dynamic random access memory (DRAM), within the apparatus to temporary storage of an interactive television service content such as games, news or TV listings. Often, a content item is broadcast alongside a digital television service and shares the same multiplex. In which case, a cue for allowing selection of the content item may be displayed over a television programme in a format or style specific to the item. Users may invoke an item of content belonging to an interactive service by selecting a key on a remote control that corresponds to the cue displayed on the screen of the apparatus. The item is downloaded to the storage area from a continuously broadcast data "carousel" and executed.

The downloaded item may be split into multiple objects, some comprising executable application software, and others comprising data objects including graphics, video, text and sound objects. Each object may reference other objects. Objects typically remain in storage until the user selects a cue corresponding to another content item, whereupon the previous item is either wholly or partially overwritten by the new item. Hence, if the user were to select the original item again, its objects must again be downloaded. A problem with this approach is that a user experiences an undesired delay between selecting the cue and the item appearing on the television screen while the item's objects are downloaded to the apparatus. Also, the broadcaster must broadcast repetitively each item, usually many hundreds or thousands of times during a day. This is wasteful of bandwidth and is costly to terrestrial broadcasters whose bandwidth is often limited compared to those of cable and satellite counterparts.

Another approach is to broadcast content items only a small number of times, such as once or twice per day, and to cause the apparatus to power up and to store them in non-volatile memory (a common form being referred to as "flash" memory). This reduces bandwidth wastage and makes selection of items more responsive because the items do not have to be loaded from a data carousel in real time. However, given that volume television receiving apparatus are cost sensitive and that their main purpose is for watching television, a disadvantage of this approach is that it loads incremental memory costs onto the apparatus. Alternatively, items may be broadcast a small number of times per day and stored in DRAM only. This has the advantage of reducing materials costs and improving responsiveness to user selection of cues but requires the apparatus to be powered up or in low power standby in order not to lose the stored items.

BRIEF SUMMARY OF THE INVENTION

According to one aspect of the present invention, there is provided an interactive television system comprising means for receiving television signals; means for receiving data for implementing an interactive television service, an internal memory and means for storing the interactive television data on a removable, non-volatile memory.

Many television apparatus include card readers in order to allow users playback features, for example, for the display of photographs etc. The present invention takes advantage of this functionality by using the same memory cards to store interactive content items received by a television apparatus. This means that the range of services that the television receiving apparatus can handle can be extended without requiring any significant additional memory to be added during manufacture of the apparatus. The removable memory card is employed to manage and store a range of content items, each corresponding to a service, including applications and data according to each user's preference, and to allow a user to pay for access to content items of a desired service, and to execute and render said items securely to the apparatus.

Means may be provided for automatically copying to the removable memory information in an internal memory, so that the removable memory acts as a backup. In this way, the apparatus provides a user transparent backup facility for volatile content items stored in the apparatus.

Means may be provided for prompting a user to indicate whether interactive television service information is to be stored on the removable memory. This may be done in response to connection of a removable memory device. In particular, the apparatus is preferably operable to detect whether a removable memory, for example a memory card, has been inserted into a card reader connected to the apparatus for the first time. The apparatus prompts the user on whether to reserve storage on the card and tags a portion of the card's non-volatile memory accordingly. In the event that the user confirms the prompt, the apparatus backs up content previously downloaded to the apparatus' volatile memory to a reserved portion of the non-volatile memory on the card. Upon powering up, the apparatus downloads time, date and service version information from a broadcast source; reads the content version information stored on the memory card to determine whether the content items are expired, and then restores the content objects and data from the memory card to the apparatus's volatile memory if they are not expired.

Means may be provided for generating a user interface using information stored on the removable memory. This may be done by merging information in both the internal memory and the removable memory and using this to provide a user interface that has user selectable interactive services that are accessible via information in both the internal and external memories. Within the user interface, user selectable interactive services may be marked to indicate that they are available via the removable memory.

The apparatus may provide a facility for selecting and downloading of content items to external memory cards and for retrieving and viewing of the same via the apparatus at a later time. The apparatus determines which content items may be stored in external, removable cards. The apparatus detects whether an unallocated memory card has been inserted into a card reader connected to it, whereupon a user is prompted to allocate storage to the card for later downloading to it of content items. Where the apparatus detects that a card with allocated memory is connected, the apparatus downloads and displays a menu listing one or a plurality of services. Services whose content items must be stored on a removable card are highlighted differently to those that are stored in volatile DRAM internal to the apparatus. The apparatus determines which services the user selects from the menu.

Preferably, the apparatus powers up from standby at predetermined times of the day to download from a broadcast source the objects corresponding to the selected items to DRAM within the apparatus. The apparatus generates digital signatures for the downloaded content objects and stores the signatures in non-removable, non-volatile memory within the apparatus. The apparatus further updates the menu of services, highlighting those services whose content items have already been downloaded and stored to the removable card and may be selected by the user for immediate display. Finally, on selection by a user of a service from the menu that is stored on a card, the apparatus retrieves the service's content items from the removable memory, verifies that they are authentic and executes them.

Information relating to one of the services may be presented in a supplemental cell within a services catalogue in response to a user input, such as highlighting one of the services. The additional information may be provided in a dedicated area of the screen, preferably separate from the services listings.

According to another aspect of the invention, there is provided a method for providing interactive television services to a user comprising: downloading interactive television service information to a television system; storing the interactive television service information on a removable memory device and using the stored interactive television service information to provide interactive services.

BRIEF DESCRIPTION OF THE SEVERAL VIEWS OF THE DRAWING(S)

Various aspects of the invention will now be described by way of example only and with reference to the accompanying drawings, of which:

FIG. 18 shows the process employed by the television apparatus to download and manage interactive television service objects.

DETAILED DESCRIPTION OF THE DRAWINGS

Figure 1:
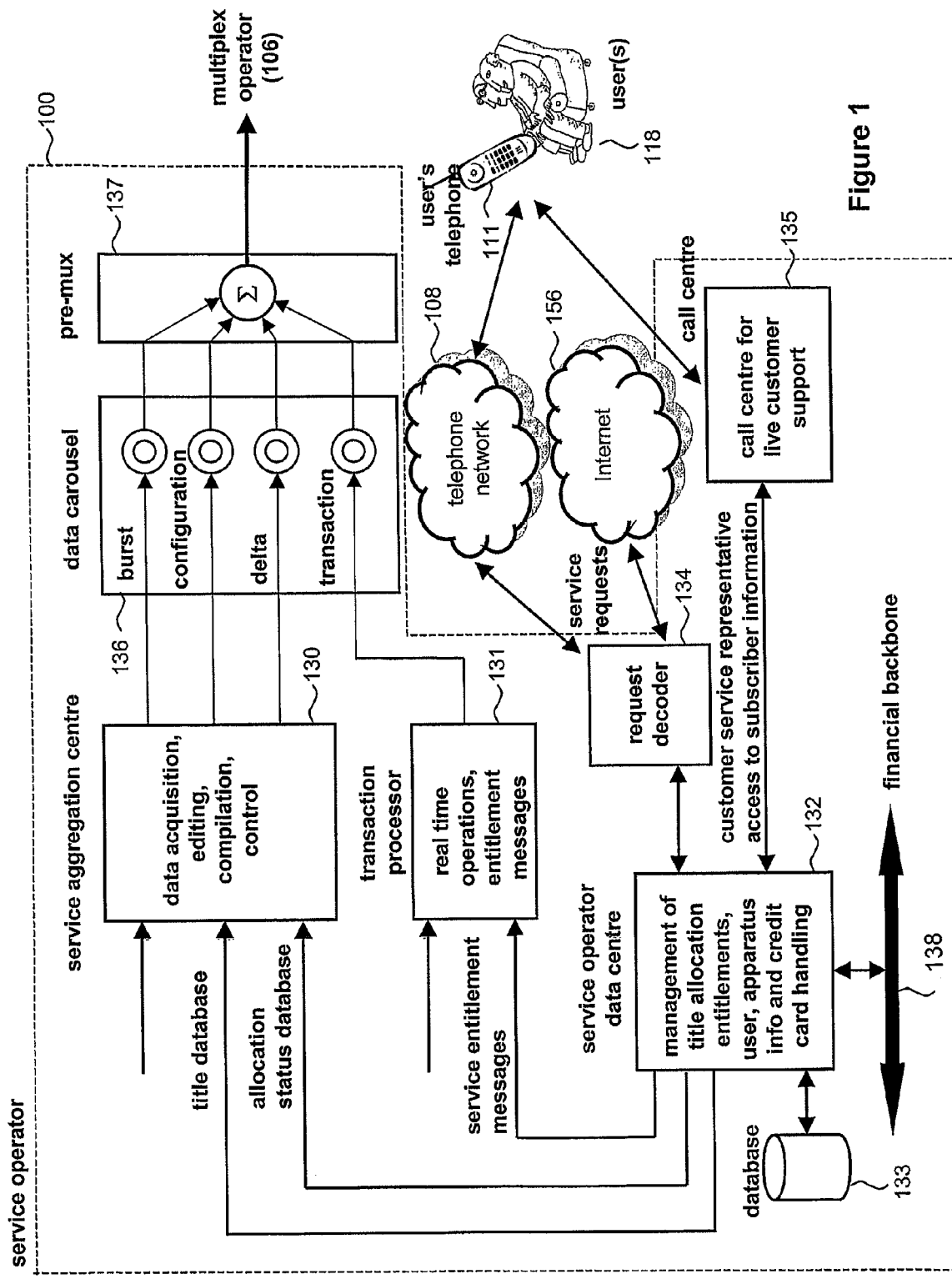
FIG. 1 is a block diagram of an end-to-end interactive television service broadcast system.

FIG. 1 shows a service operator's subsystem 100. This contains functions that may be co-located in one geographical location, or may be distributed across a number of locations and networked together. These functions include a pre-multiplexer 137, a data carousel 136, a service aggregation centre 130, a transaction processor 131, a service operator data centre 132, a database 133, a request decoder 134 and a call centre 135. The service aggregation centre 130 receives incoming service content items (such as electronic game applications, movies, music, news, weather forecasts and editorial content such as magazines) from external parties and processes and compiles the content and applications together to form data streams. The data streams are transmitted to the data carousel 136.

The service operator's data centre 132 receives and aggregates users' 118 service requests across a mobile and/or fixed telephone network 108 via a request decoder 134. The request decoder 134 is adapted to decode mobile telephone short message service (SMS) text messages composed by the user 118 and/or dual tone multiple frequency (DTMF) tones generated by a user 118 pressing the telephone 111 numeric keys 123. The request decoder 134 is further adapted to determine a user's calling line identification (CLI) in order to look up a user's account number. The data centre 132 may also receive telephoned, vocal service requests from users 118 via call centre 135.

The operator data centre 132 manages and stores users' contact and account details on a database 133. These details are used for processing incoming registrations and service requests from the request decoder 134 and communicating transactions to credit card and other payment facilities via a financial backbone 138, for broadcasting service entitlement messages over the air via the transaction processor 131 and data carousel 136. In the embodiment described, the database holds one or more telephone numbers that are registered prior to a user's placement of service orders per each user account. The transaction processor 131 is configured to receive service entitlement messages from the operator data centre 132, generate service entitlement management packets addressed to individual users' apparatus 109 and broadcast these via the carousel 136 for immediate real time play-out. Data is preferably transmitted as one or more modules using the so-called DSM-CC (Digital Storage Media Command and Control) carousel 136. The DSM-CC carousel is a data stream transmitted by the broadcasting station alongside television audio-video service data, where each module comprises executable code and/or data components of one or more data objects that may be downloaded by the apparatus.

Figure 2:
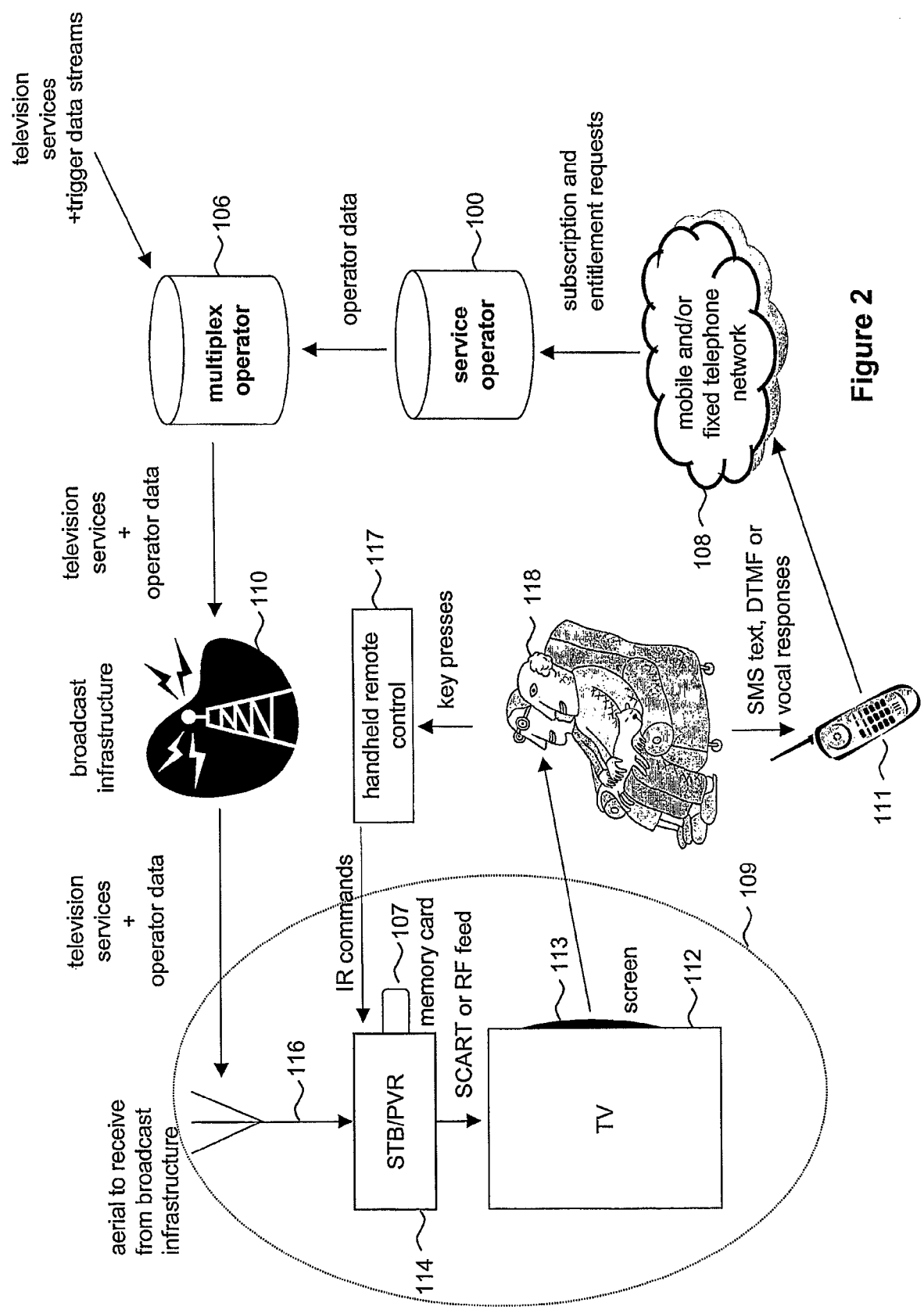
FIG. 2 is a block diagram of a television receiving apparatus that is controlled by a user and configured to allow interaction with external entities via a mobile or fixed wire telephone network.

FIG. 2 shows how data streams from the service operator 100 are transmitted to a broadcast multiplex operator 106 for transmission via a broadcast transmitter infrastructure 110 using the DVB (Digital Video Broadcasting) family of public satellite (DVB-S), and/or cable (DVB-C) and/or terrestrial (DVB-T) broadcast formats to users' homes. More specifically, FIG. 2 shows a user apparatus 109 that includes a set-top-box (STB) or personal video recorder (PVR) 114 that receives television services, including data services from the service operator's subsystem 100, via an aerial, satellite dish or cable socket 116 and connects to a television 112 for display purposes via a screen 113 to one or more apparatus users 118. Users 118 may communicate with the service operator 100 via a telephone network 108. Messages can be sent by pressing key sequences via a cordless, wired or mobile telephone 111 or by using speech. In any case, the user has to be provided with a dedicated telephone number that allows communication with either the request decoder 134 or the call centre 135.

Several other embodiments may exist for apparatus 109. For example, the functionalities of the STB or the PVR 114 may be integrated, or partially integrated, with the television 112 and/or display 113. In another embodiment the functionality of the STB or the PVR 114 may be performed by a personal computer (PC) and the television's screen display 113 function is performed by a display monitor. In yet another embodiment, the aerial 116, STB 114, television 112, remote control 117 and screen 113 functionalities may be integrated into a single handheld apparatus, such as a cordless or mobile phone, PC notebook, media player or video jukebox, palmtop computer or a personal digital assistant (PDA).

Figure 3:
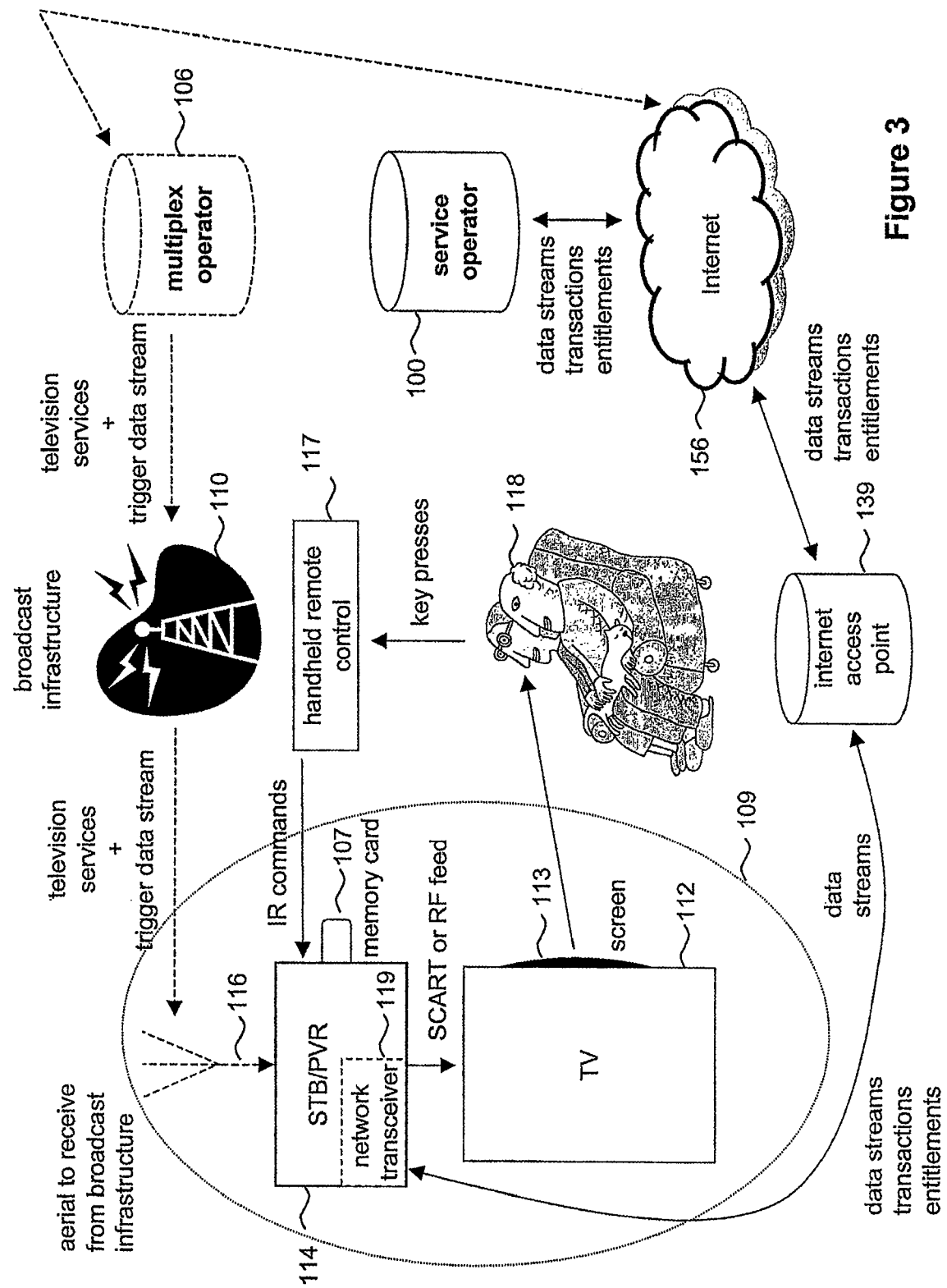
FIG. 3 is a block diagram of a television system that is configured to allow direct interaction with external entities including a service operator via the Internet.

In a yet further embodiment apparatus 109 may be linked to the service operator 100 via a network transceiver 119 that is linked to the Internet either directly or via a domestic access point 139 containing a bridge, router or gateway function as shown in FIG. 3. Preferably the apparatus is linked via a wireless network such as a Bluetooth wireless local area network (LAN), or via "WiFi" according to the public IEEE 802.11a/b/g LAN specifications or via a wide area mobile telephone network data transmission specification such as the General Packet Radio Service (GPRS). In the Bluetooth case the transceiver 119 is a Bluetooth network adaptor and a mobile telephone adapted with a Bluetooth transceiver may take on the role of the access point 139 to the Internet via GPRS. In the WiFi case, transceiver 119 is a WiFi network adaptor that may be interfaced to the Internet via a WiFi access point or router 139.

In such cases where the apparatus 109 is linked to the Internet for the purpose of data exchange, the apparatus may continue to receive television channels and other services by broadcast means via infrastructure 110 and aerial 116. Alternatively or additionally, apparatus may receive television channels and interactive television services via the Internet 156, access point 139 and network transceiver 119. In one embodiment, LAN transceiver 119 may be a Bluetooth transceiver wirelessly connected to a local access point 139 function that is incorporated into a mobile telephone 111, where the telephone is connected to service operator 100 via the telephone network 108 or the Internet 156. Preferably the transceiver 119 is removable from the STB 114 and connectable via a hardware interface 155 such as a USB (Universal Serial Bus). Alternatively, the hardware interface may be the industry standard PCMCIA (Personal Computer Memory Card International Association) "PC Card" 68-pin Type I, II or III interface or an SD Card interface.

Figure 4:
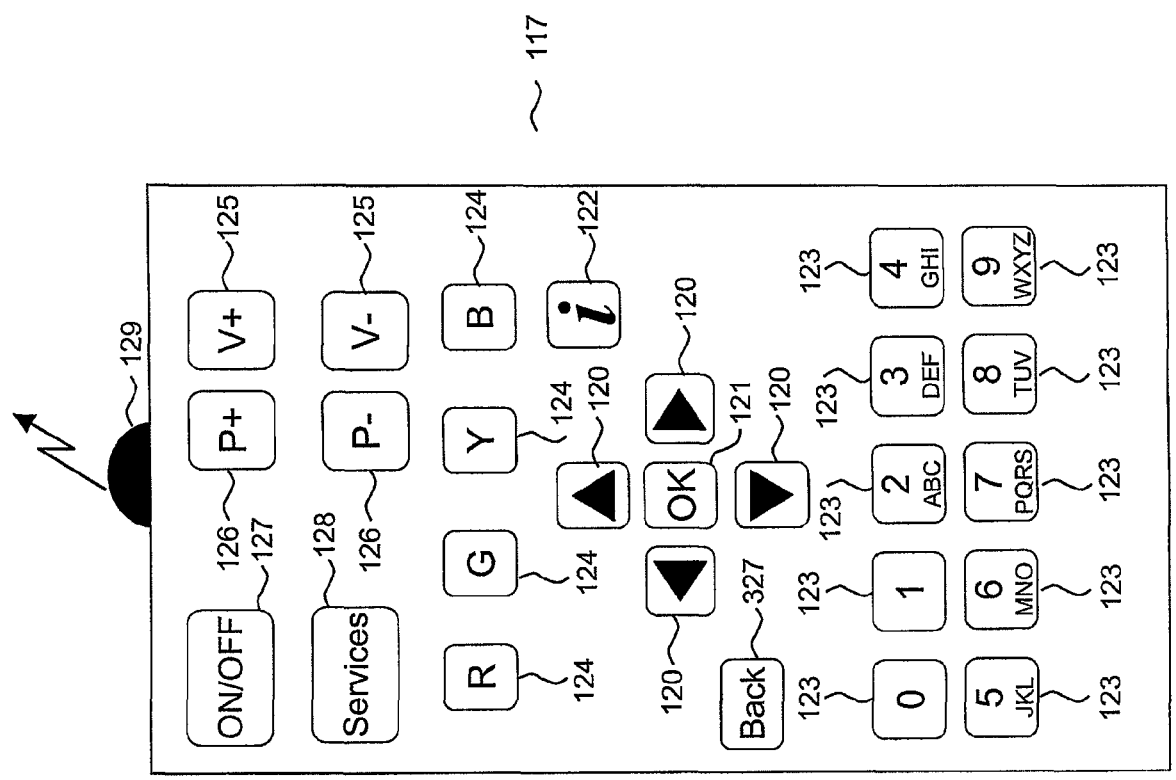
FIG. 4 is a top view of a remote control handset for use in the system of FIG. 2.

Users operate a handheld remote control 117 to control the apparatus 109. FIG. 4 shows an example of a suitable handset. Remote control 117 is operable to send commands to apparatus 109 preferably by wireless means. In the preferred embodiment, the control 117 uses an infrared transmitter 129 to send commands to apparatus 109 that correspond to keys as they are pressed by the user, where such keys include: apparatus power ON/OFF toggle 127, volume up/down 125, channel up/down 126, red/green/yellow/blue fastext keys 124, up/down/left/right arrow keys 120, OK/select key 121, 0-9 numeric keys 123 labelled with multiple tap alphabetic characters, a "Back" key 327 for reversing out of a user interface selection and a "Service" key 128 for invoking the apparatus's interactive services. Alternative embodiments for handheld control 117 may include an apparatus whose keys are labelled to correspond to those of a television control apparatus, such as may be achieved using a mobile or cordless telephone, a standard "QWERTY" keyboard, a personal digital assistant (PDA), or a touch sensitive, handheld display where portions of the display are marked with labels corresponding to television control commands.

Figure 5:
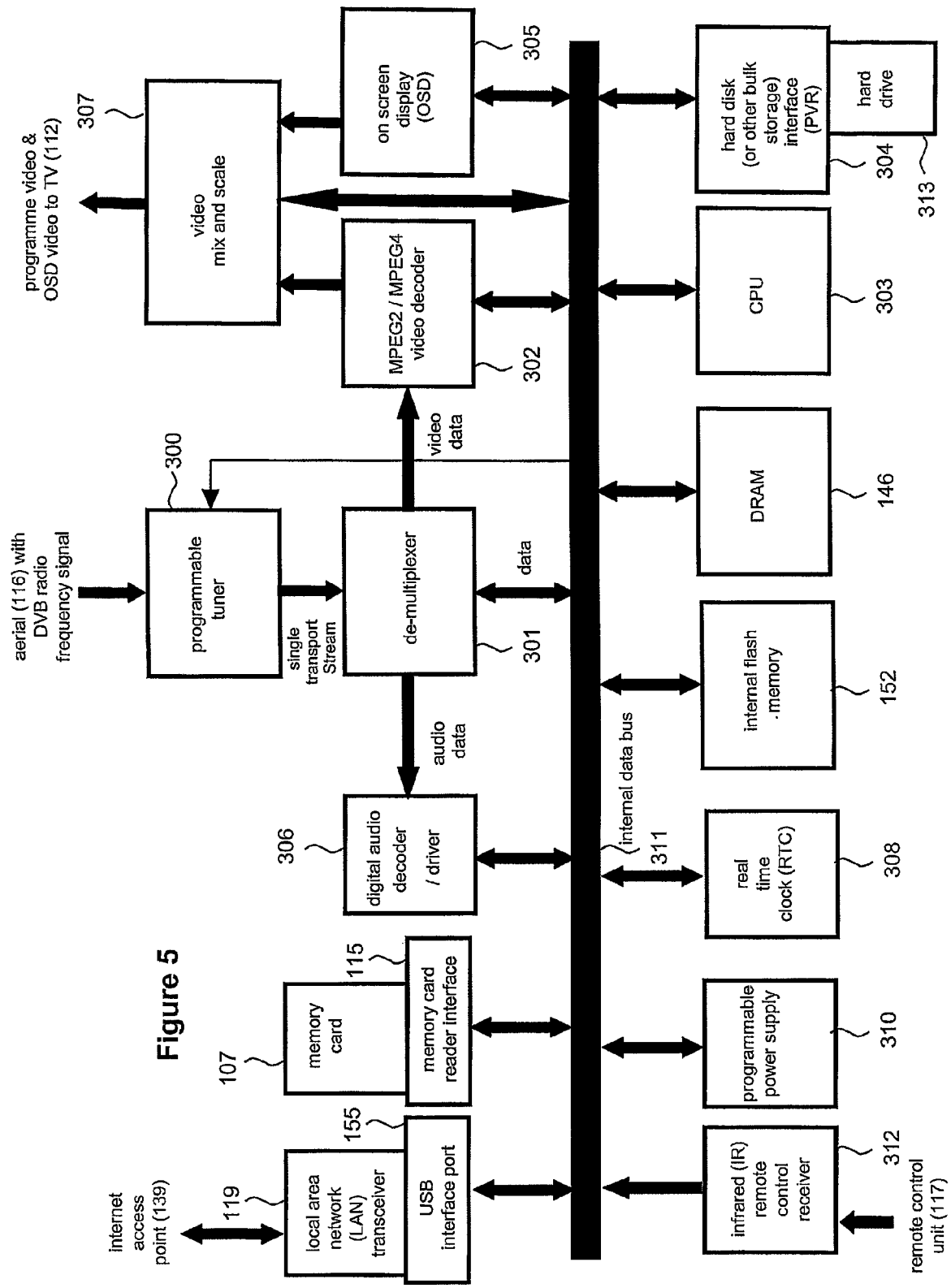
FIG. 5 is a block diagram showing the main functions within a set-top-box (STB) and their interconnection.

FIG. 5 shows the internal functional elements of a typical digital STB 114 designed to receive and decode DVB television transmissions. These include a CPU 303 coupled via an internal data bus 311 to volatile DRAM 146 and internal, non-volatile (flash) memory 152 that are integral to and not removable from the apparatus. The integral flash memory 152 contains amongst other things, digital signatures and keys. Its contents must not be readable across the STB's connection interfaces to external devices. Also connected to the internal bus is at least one memory card reader interface 115 for allowing communication with an external memory card 107. Alternatively or additionally the STB may also incorporate a single reader interface 155 that is simultaneously compatible with multiple memory card formats such as Memory Stick, Secure Digital (SD), Smart Media (SM) and Multi Media Card (MMC). Means of connecting memory cards to electrical apparatus are known in the art and so will not be described in detail.

The CPU receives user commands from remote control 117 via an infrared receiver 312. When the STB is in standby, a real time clock (RTC) or countdown timer 308 controls when portions of the STB are to be powered up. In the preferred embodiment, when the STB is in standby mode between downloads, the CPU and memory operate in a low power mode with all other blocks except an RTC 308, IR receiver 312 and programmable power supply 310 powered off completely. The power supply is controlled by the CPU to apply and remove voltage rails to one or more of the other blocks depending on whether the STB is required to enter an active, standby or download state. The STB may have personal video recording (PVR) features and contain some form of bulk storage interface 304 connected to a hard drive 313 for storage of video and/or clips. This would typically be an ATAPI or SCSI hard disk interface, but any popular bulk data storage interface standard may be implemented.

The STB contains a programmable tuner 300, which is connected to receive DVB-T broadcasts via an aerial 116. Additionally or alternatively, the tuner may receive cable and satellite transmissions. Loader software 331 is stored in the flash memory 152. By means of the internal data bus 311, this loader software 331 is operable to program the tuner 300 and de-multiplexer 301 to receive and decode any MPEG2 transport stream (channel) present at aerial 116, including the streams (channel) carrying the service operator's 100 transmissions. The tuned transport stream is applied to a de-multiplexer 301, where elementary audio, video and data streams can be extracted. Video data streams are applied to the MPEG-2 and/or MPEG-4 video decoder 302. The output of this decoder is then combined with the on-screen display 305 to provide the video signal to the television 112. The on-screen display 305 is responsible for displaying all graphical outputs to screen 113. The video mix and scale function are capable of scaling the decoder video in order to present a reduced size live video display anywhere on television screen 113.

Figure 6:
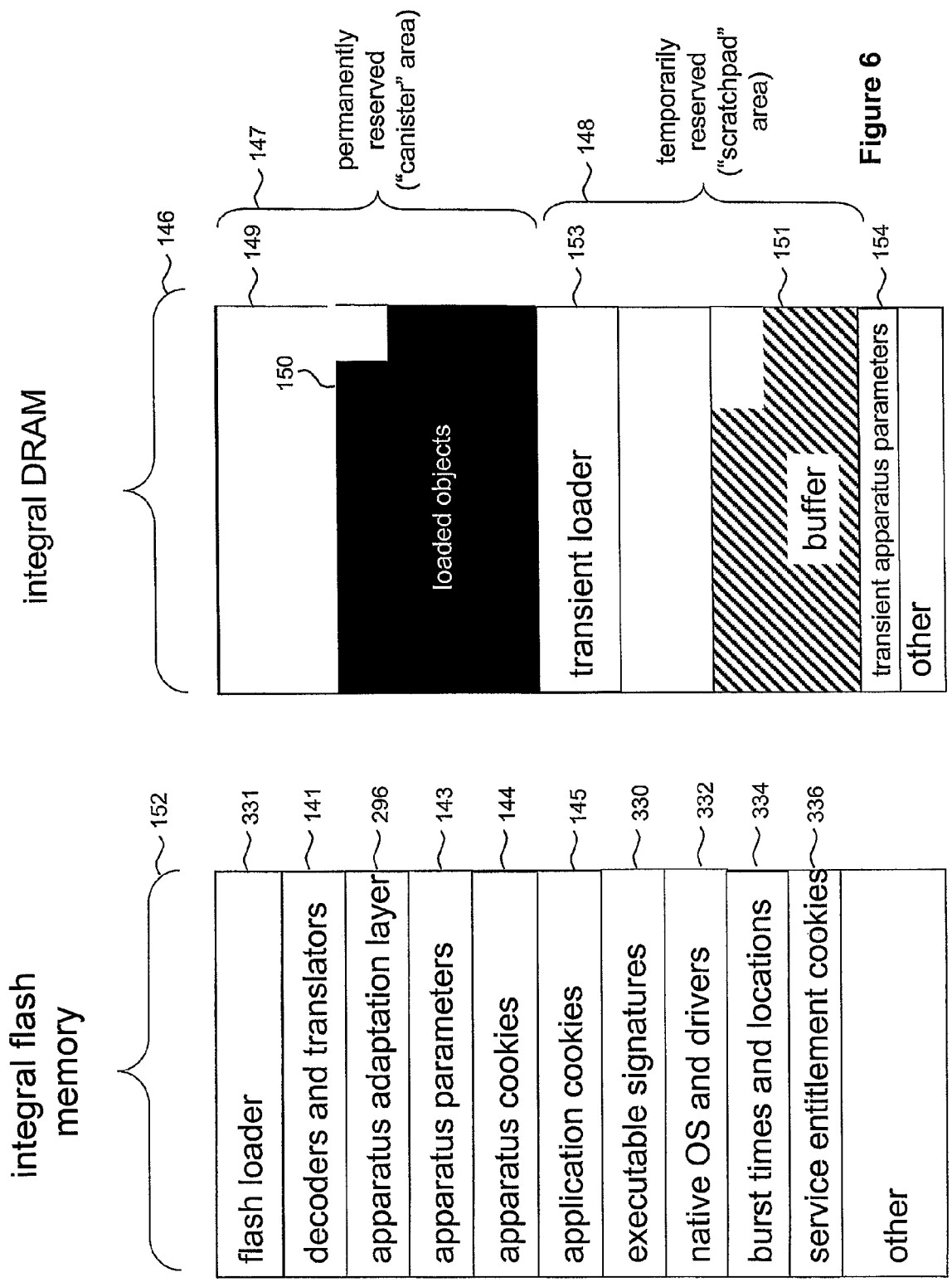
FIG. 6 shows how storage of data is allocated between volatile and non-volatile memory in the television apparatus of FIG. 2.

In use, the service operator 100 broadcasts a software stack, including operating system and multimedia playback environment, for downloading by the apparatus 109 into integral, non-removable volatile DRAM memory. This is done when the apparatus is not in use or has been placed in a low power standby mode. Periodically, the apparatus loads objects belonging to service content items (such as, for example, an electronic programme guide or a game) into DRAM. The allocation of memory within the apparatus 109 is shown in FIG. 6. An area of STB 114 memory within a volatile portion of dynamic random access memory (DRAM) 146, the so called "canister" memory area 147, is reserved exclusively for storage of downloaded object data 150 that comprise the interactive service from the service operator 100. With current memory costs and addressable limitations, the size of the canister memory area 147 is typically 16 to 32 Mbytes.

Another area of memory, a so called "scratchpad" area 148, is temporarily reserved for the storage of intermediate or temporary data during execution of an application or while processing downloaded objects such as, for example, a service catalogue. In a preferred embodiment, the scratchpad area 148 is composed of DRAM but in other embodiments of the apparatus, such as within a hard disk based personal video recorder (PVR), the scratchpad 148 may comprise hard disk storage, or a combination of hard disk storage and DRAM. A small area of DRAM is additionally allocated to storage of transient apparatus parameters 154 that denote the status of the apparatus's connectivity to external devices such as, for example, whether a memory card 107 is connected to the apparatus's memory card reader 115 and the properties of both devices. The transient parameters 154 are updated by the flash loader program 331 (see below) upon power up of the apparatus and periodically thereafter by polling by the CPU of external connection interfaces such as USB port(s) 155 or card ports 115.

Portions of non-volatile, integral flash memory 152 are allocated to storage of firmware and data associated with maintenance of the canister 147 and service content items 295 stored within it, and are arranged and referenced as a file system. The firmware includes a bootstrap loader program in integral flash memory 331, which is executable code that controls the download of objects from burst broadcasts 173 and generates loaded data objects 150 within the canister 147. To maximise the apparatus's flexibility throughout its service life, only minimum functionality is burnt into the flash loader 331. The remaining "transient" portion of the bootstrap loader 153 is downloaded to volatile memory 146 at the commencement of downloads from burst broadcasts 173 and is wholly or partially erased after the download has occurred.

Decoder and translator programs 141 are also stored in integral flash 152. These are software modules that may be called by the flash loader 331 and/or transient loader 153 to process downloaded objects. For example, the canister loader may first be required to invoke a decryption decoder to render an object to clear text. Another decoder may be invoked subsequently to decompress the clear text object. Preferably, all executable objects are broadcast in a device independent form. Preferably, the canister loader invokes a translator to convert device independent executable objects to a form where they are directly executable by the apparatus's central processor unit (CPU) 303. Also within the flash memory 152 is an apparatus' adaptation layer 296. This has apparatus specific code stored in flash 152 that binds the canister to the apparatus's native drivers and operating system 332 (STAPI and OS20 in the preferred embodiment) and hardware (ST5100 in the embodiment described). This will be described in more detail later.

Other firmware and data that are stored in integral flash 152 include apparatus parameters 143, apparatus cookies 144, application cookies 145, executable signatures 330, burst times and locations 334 and service entitlement cookies 336. The apparatus parameters 143 may be brand, model number and hardware characteristics such as CPU speed, screen resolution, size of canister, scratchpad memory allocations and types of connection interfaces (e.g. PC Card, USB, SD Card) attached, if any. These are burnt into non-volatile memory during manufacture and are read only throughout an apparatus's service life. The apparatus cookies 144 are small data files that comprise application independent apparatus configuration information, such files including those containing an account number and a user's personal identification number (PIN) corresponding to a pre-registered account, which information must survive power loss.

The application cookies 145 are small data files that hold certain states of an application 293 that are to be restored the next time it is invoked. For example, an electronic programme guide application 293 may permit a user to remove or order certain channels in his/her set-up preferences by saving the configuration as a cookie 145. Or, for example, a game application may log a user's name and high score as a cookie 145. Or, for example, an entitlement message may have been downloaded and stored as a cookie 145 for later reference by an application 293 that is associated with a particular service to determine whether access is to be given to all or certain portions of the service's features or content 292.

The digital signatures 330 are the results of hash function computations of trusted executable code objects. These signatures are compared against those computed against objects from external, un-trusted devices, such as a memory card, for verification that the external object is from an authorised source. The service entitlement cookie 336 is a small file that contains information relating to a user's entitlement rights in respect of a service or a group of services. For example, a user may have subscribed to a service indefinitely or for a set period or based on a number of service uses. All of this information would be included within the entitlement cookies 336.

Figure 7:
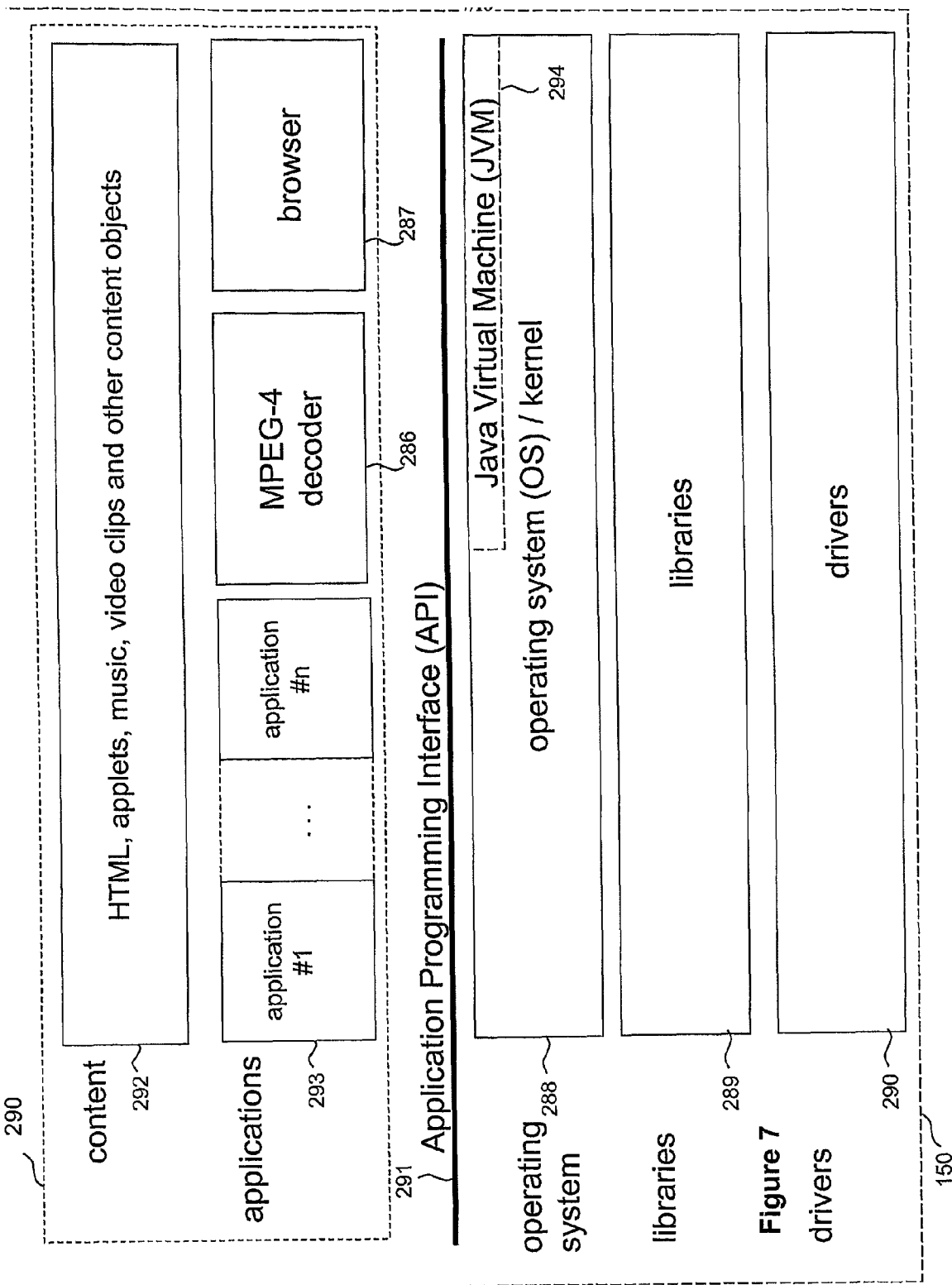
FIG. 7 shows memory allocation as implemented by the television subsystem of FIG. 2 according to a layered software architecture.
Figure 8:
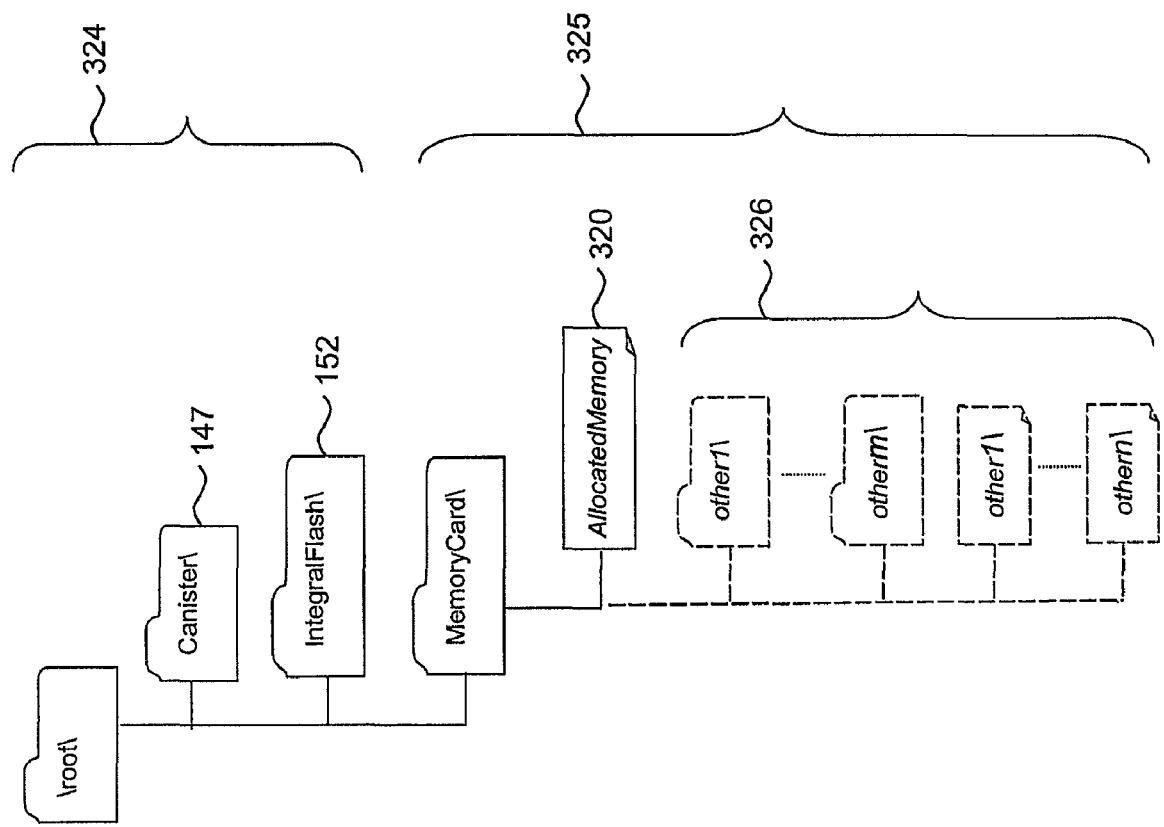
FIG. 8 shows how memory within the television apparatus and removable memory card of FIG. 2 are arranged and referenced by the apparatus as a unified file system.

FIG. 7 shows the structure of programme software, data and service content objects 150 stored within the DRAM canister area 147. The data objects within the canister may be referenced as within a file system. It is desirable that applications loaded into the canister display content in an identical manner across as many brands and types of apparatus as possible. This is necessary to minimise broadcasting of different versions of an application or service to different apparatus, which is costly to administer and wasteful of bandwidth. For this reason, a layered software stack is used. This includes a virtual machine based operating system 288 (Intent 1.5 in a preferred embodiment) that executes application objects in a functionally identical manner across canisters in a broad range of apparatus hardware types. This may contain a JVM (Java Virtual Machine) 294 to support execution of applications 293 loaded to the canister in Java bytecode form. The operating system 288 may also contain communication protocol software, such as TCP/IP (Terminal Control Protocol/Internet Protocol), to allow applications 293 to receive and transmit data across the Internet. Code libraries 289 are provided for use by the operating system layer 288. Driver software 290 controls apparatus programmable hardware (such as, for example, display controllers, sound generators, tuners and de-multiplexers) via the apparatus adaptation firmware 296 corresponding to a particular native apparatus hardware and software configuration. The canister's operating system 288 references the canister 147 and integral flash portions 152 of memory as a hierarchical file system, as shown in FIG. 8.

FIG. 7 shows the structure of programme application software, data and service content stored for the preferred embodiment of TV apparatus 109. The content items 295 are each arranged as combinations of applications 293 and various data or content objects 292 which the applications may process and render to the screen. Preferably, the applications 293 include one or more game application(s), an electronic programme guide (EPG) application and EPG extensions to permit ordering of DVD titles and display of video clip trailers, a chat application and a graphical and hypertext browser 287. The applications communicate with the operating system 288 and code libraries 289, graphics and data communication drivers 290 and other components via a standard application programming interface 291. The EPG employs a browser 287 to display marked up content and a software decoder 286 to play MPEG-4 and other audio-video formats. Each application 293 may have associated with it data or content 292 which it may process. Preferably all applications are adapted to run over Java, or some other form of, virtual machine 294. Particular content items 295 may be downloaded from broadcasts 171 along with the drivers 290 necessary for the hardware's operation depending on the values of the transient apparatus parameters 154 stored in the DRAM 146. These values denote whether hardware devices, such as the network transceiver 119 or a memory card 107, are connected to the apparatus 114.

Figure 9:
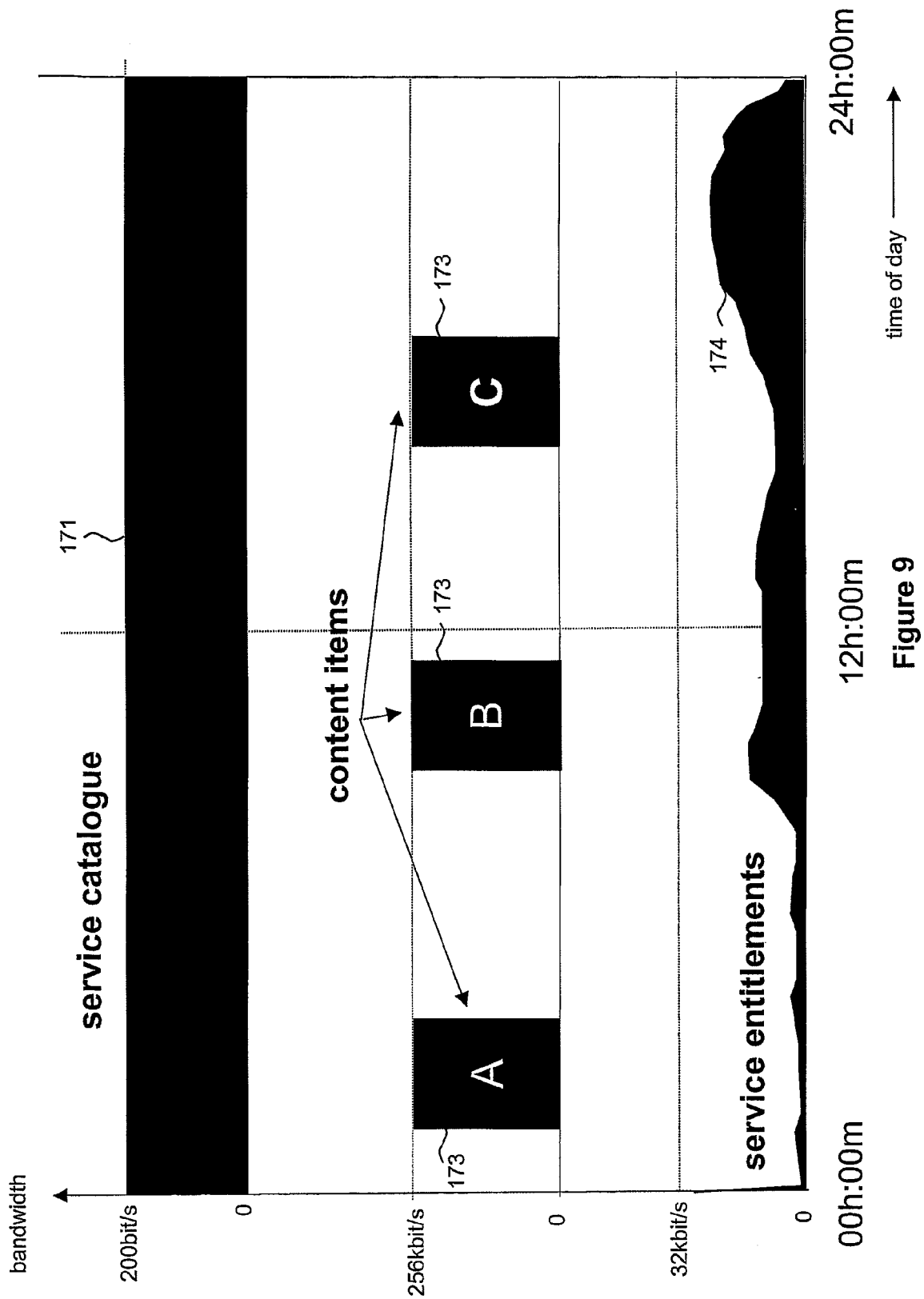
FIG. 9 shows the bandwidth consumed during the day by the various components of the interactive television service operator's broadcast data stream.

FIG. 9 shows information that is broadcast by the service provider via the data carousel 136. This can be downloaded to the apparatus 109. Typically, this includes service catalogue information, which is downloaded throughout the day as a continuous data stream 171. Content items are normally downloaded as data burst streams 173 at predetermined intervals. Service entitlement information 174 is downloaded in response to user requests, and so data on this stream tends to peak in the evenings.

Removable memory cards 107 may be connected to the apparatus 109 via card reader interface 115. Alternatively, a removable USB memory pen may be attached to interface port 155. In either case, the apparatus recognises the memory device upon connection and attempts to mount said device's external file system 325 onto its integral file system 324. Thus, when mounted, additional files such as a memory file extension file AllocatedMemory 320 (see later) and additional directories and files 326 can be read from, written to, modified, deleted, appended to or executed by the operating system.

Figure 10:
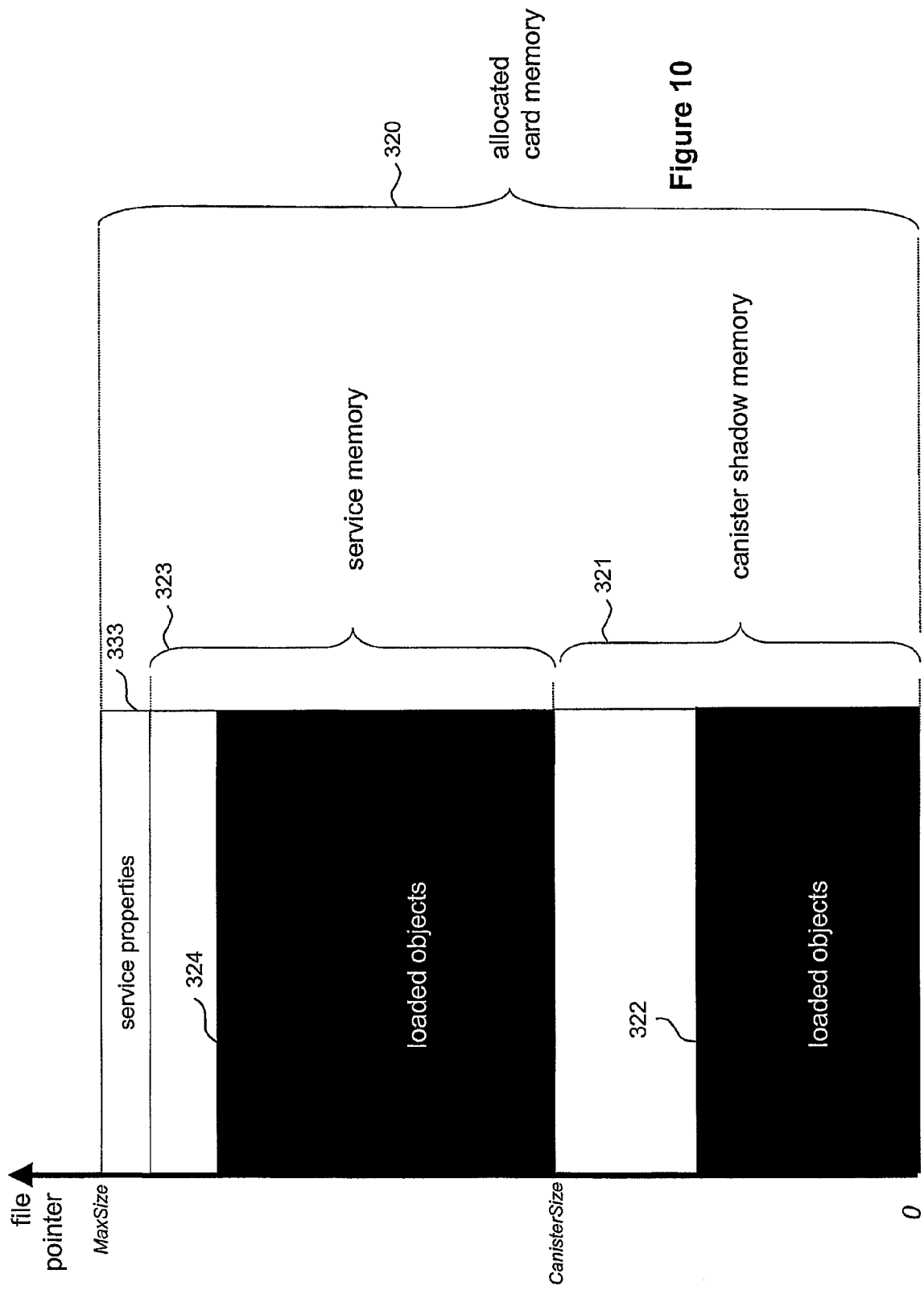
FIG. 10 shows how reserved memory within the memory card is partitioned into blocks of addressable memory within a reserved file.

FIG. 10 shows how the AllocatedMemory 320 is divided into two addressable card memory allocations: canister shadow memory 321 and service memory 323. Canister shadow memory is allocated automatically to storage of a back up of the apparatus' volatile canister memory 147 including those services whose content items are normally stored within the canister memory areas 147. Service memory 323 is allocated to the storage of content items that belong to additional, optional services stored only on the memory card 107 which a user may select from a menu. For each service whose content items have been selected by the user for storage on the card, a number of parameters are stored within a service properties data 333 area on the card to enable the apparatus to properly store and load the services. These parameters include: ServiceId: the service's identifier; Title and Description: text title and text description of the service; ContentItemId[ ]: an array of elements containing identifiers for each content item; ContentItemLocation[ ] and ContentItemSize[ ]: an array of elements denoting the position and size respectively within service memory 323 of each content item; and ContentItemVersion[ ]: an array of version numbers corresponding to the version number for each item.

Figure 11:
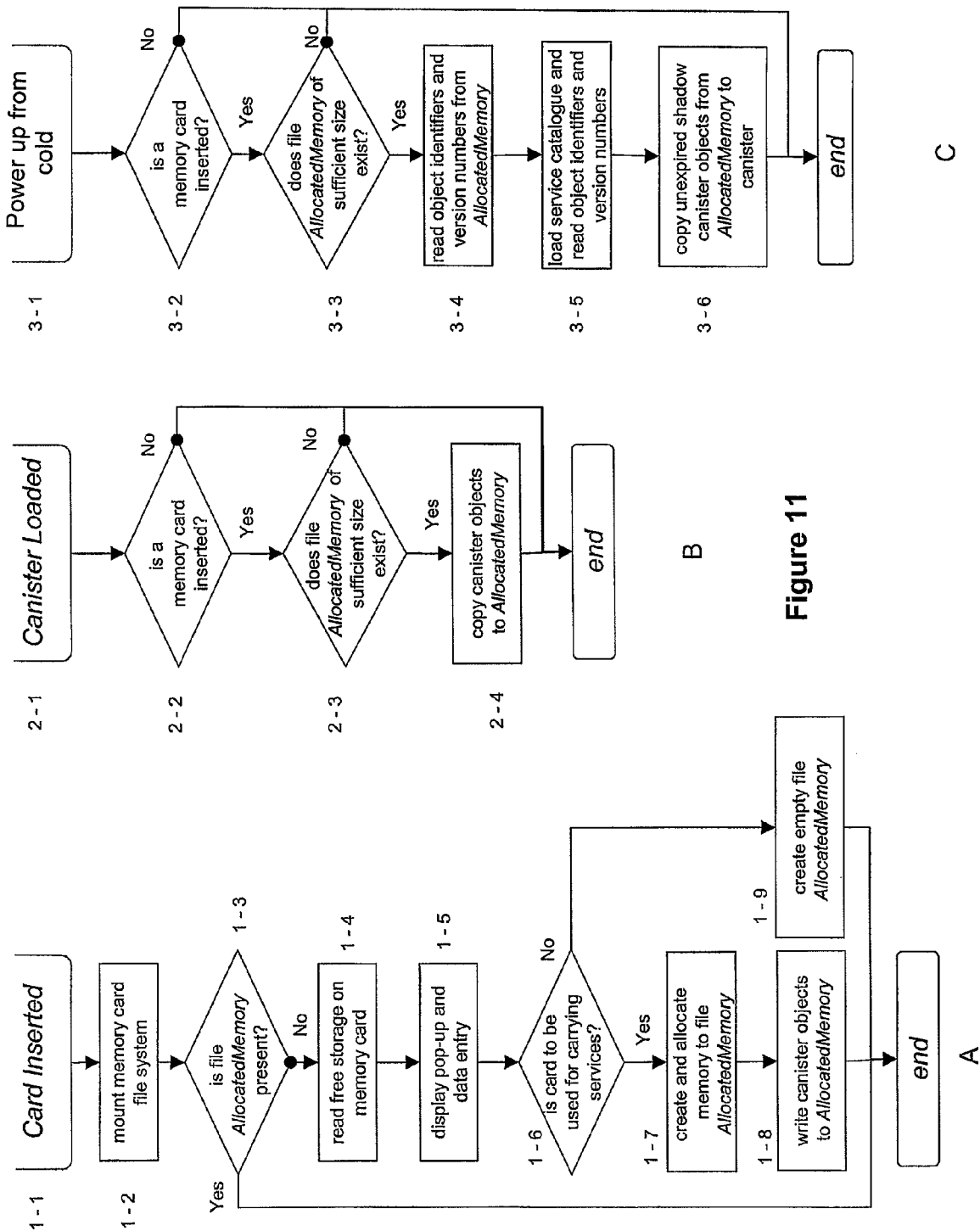
FIG. 11A shows the process performed by the apparatus when a memory card is inserted.
FIG. 11B shows the process performed by the apparatus when the canister memory is loaded or updated.
FIG. 11C shows the process performed by the apparatus when it has powered up from cold.
Figure 12:
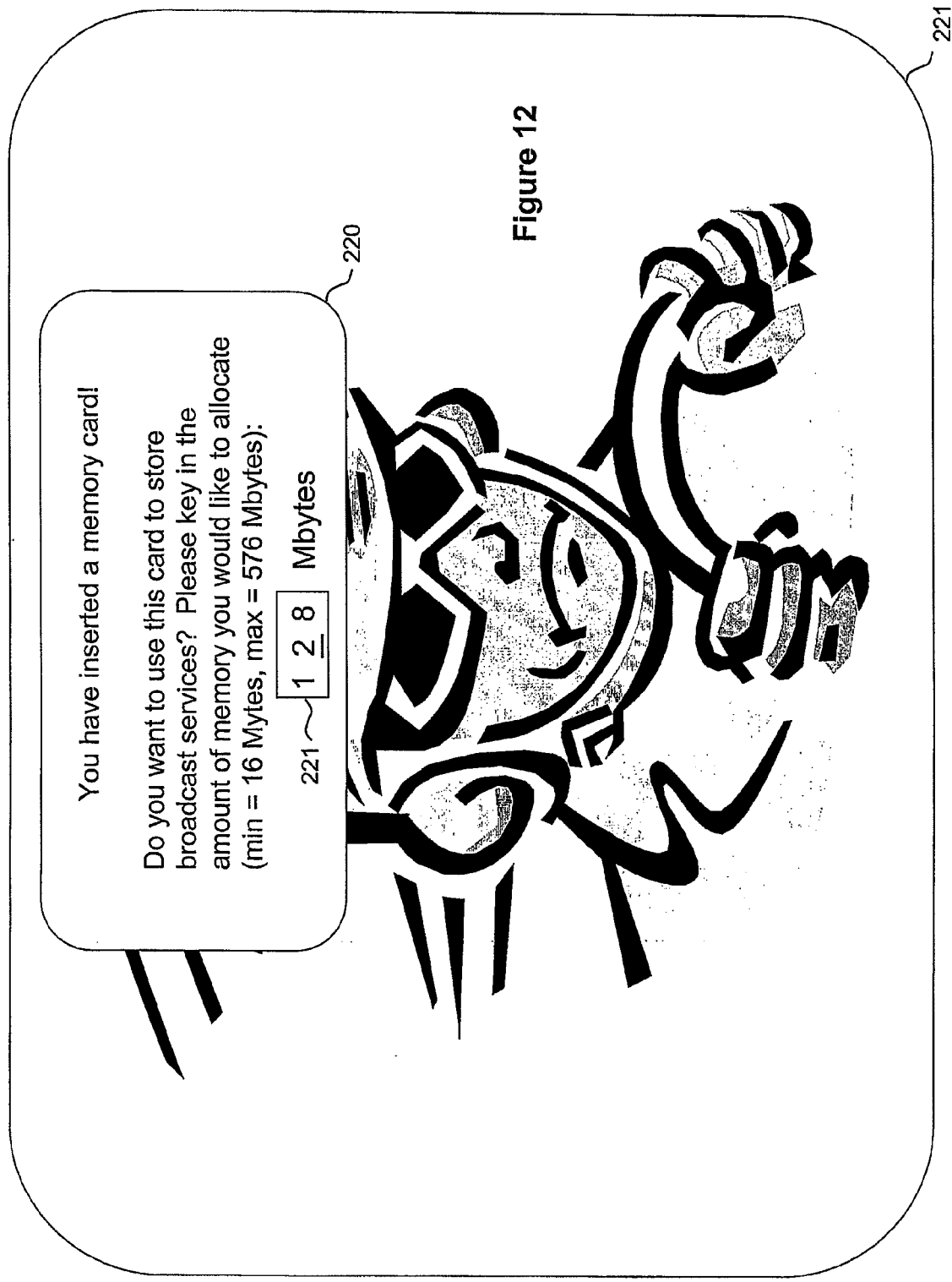
FIG. 12 shows the on-screen prompt displayed by the user interface of the television apparatus when a memory card is inserted into the apparatus for the card's first time.

FIG. 11A shows the process performed by the apparatus when a memory card 107 is inserted into the memory card reader interface 115 whereby memory is allocated for backup of canister memory and storage of additional content items. Whenever a card is inserted (1-1), the apparatus mounts the card filing system (1-2) and tests whether a file named AllocatedMemory 320 is present within the card's filing system 325 (1-3). In a preferred embodiment, the file name AllocatedMemory is a hash of the apparatus machine address. This allows a single memory card to be employed with multiple apparatus for the purpose of storing service content. In the event that the card was inserted for the first time and so the file AllocatedMemory is not present (1-3), the apparatus reads the amount of free storage on the memory card (1-4) and displays a pop-up banner 220 over the television programme or service currently being displayed 221 (1-5) as shown in FIG. 12.

The pop-up 220 informs the user that a memory card has been inserted into the apparatus. It also displays the amount of free storage currently on the memory card, a minimum amount of storage corresponding to the size of the canister memory 147 and a maximum amount of storage corresponding to the amount of free card memory available capped to a finite limit. The pop-up 220 invites the user to key in, preferably using the numeric keys 123, a storage allocation to be reserved by the apparatus on the memory card between the minimum and maximum levels. The user inputs a storage value into a data entry display box 221 or presses the "back" key 327 to clear the pop-up immediately if storage is not required. If storage is required (1-6), the apparatus writes a file AllocatedMemory onto the memory card of size equivalent to the input storage value (1-7) and then copies the contents 150 of the canister memory 147 into the canister shadow memory range 321 on the card (1-8). If storage is not required (1-6), the apparatus writes an empty file Allocated- Memory to the card [1-9], so that a user is not prompted a second time when the card is next inserted for another purpose (e.g. to view photographs stored on it).

The apparatus 109 periodically downloads content items 173 from the service operator and writes these to its volatile canister memory 147. Each time a download occurs, the apparatus 109 attempts to make a backup of the objects associated with each item 150 within the canister to the shadow memory space if a valid memory card is inserted. The process is shown in FIG. 11B. This is transparent to a user without making or seeking a prompt. When one or more objects 150 has been loaded into the canister 147 (2-1), the apparatus determines that the card is valid by detecting the existence of a file AllocatedMemory on the memory card 107 of sufficient size to back up the canister memory (2-3) when a card is inserted (2-2). If AllocatedMemory is of sufficient size (2-3), the apparatus copies the canister objects 150 into a pre-determined storage range 321 within the file AllocatedMemory 320 to form a copy of the canister objects 322 (2-4).

Each time the apparatus wakes from standby, it attempts to restore service items and objects (such as, for example, the operating system) to the canister memory from a memory card in preference to waiting to download them from a scheduled broadcast 173. This is useful because it shortens the period during which the apparatus is unusable after power up. FIG. 11C illustrates this process. When the apparatus powers up (3-1), it determines whether a storage file AllocatedMemory of sufficient size is present within a memory card 107 (3-3) if one is inserted (3-2). The apparatus reads the version numbers and identifiers for each object stored within the canister shadow memory 322 of file AllocatedMemory (3-4). The apparatus programs the tuner 300 and de-multiplexer 301 to download the service catalogue (3-5) for content items stored in the canister. For each object listed in the catalogue, the apparatus verifies that an object of the same identifier and version number already exists in shadow memory 322 and, if so, copies the object to the volatile canister memory 147 (3-6). Thus the apparatus reliably restores from a memory card a copy of its canister's contents where the card's content items are up to date, and prevents display to the user of content items that are out of date.

Many forms of content item 295 may be downloaded to memory cards. These may include media services where the content comprises text, or a marked up text (such as, for example, created using the HTML and XML formats), a picture (such as, for example, created using the JPEG, PNG format), an audio (such as, for example, created using MP3 or OGG format), or a video clip (such as, for example, created using the MPEG-2 or MPEG-4 encoding formats) an executable application (such as, for example, comprising Java bytecode, Java Script or machine code) or some combination thereof.

Applications 293 may comprise an electronic game or may enable a user to benefit from additional functionalities in apparatus 109, such as a calendar or contact address book. The service application may permit the user to use the apparatus to record and/or play back television programmes, or extracts thereof, to a removable memory card for later play back by either the apparatus or another device such as a mobile telephone or a personal digital assistant (PDA). Alternatively, an application may permit the apparatus to save still pictures taken from television programmes to the apparatus's memory or to a memory card connected to the apparatus, for later play back or display by the apparatus as a screen saver or background to a graphical user interface. Additionally, an application may permit a motion video, still picture or audio extract from a television programme or advertisement to be saved to a portion of a memory card that is not allocated to the apparatus 326.

Another example of a service is an audience measurement application for use by broadcasters and audience researchers, where information corresponding to the identities of radio and television programmes and channels displayed at any given time by the apparatus are saved to the memory card. A further instance is an application that permits the user to transfer extracts of television programmes or other media content, such as a downloaded ring tone or screen saver, to another device such as a mobile telephone 111 or a personal digital assistant (PDA) via a wireless network transceiver 119 connected to the apparatus. Yet another instance may comprise an application that permits a user to view, modify or play back media content stored on a portion of the memory card 326 that is not allocated to the apparatus 326. For example, a service may comprise a photograph viewing application that allows a user to view, rotate and/or edit a digital photograph and re-store the result back onto a memory card. Alternatively, a service may comprise an audio mixing application that allows a user to play and mix together a plurality of soundtracks and restore the edited result back onto a memory card.

Figure 13:
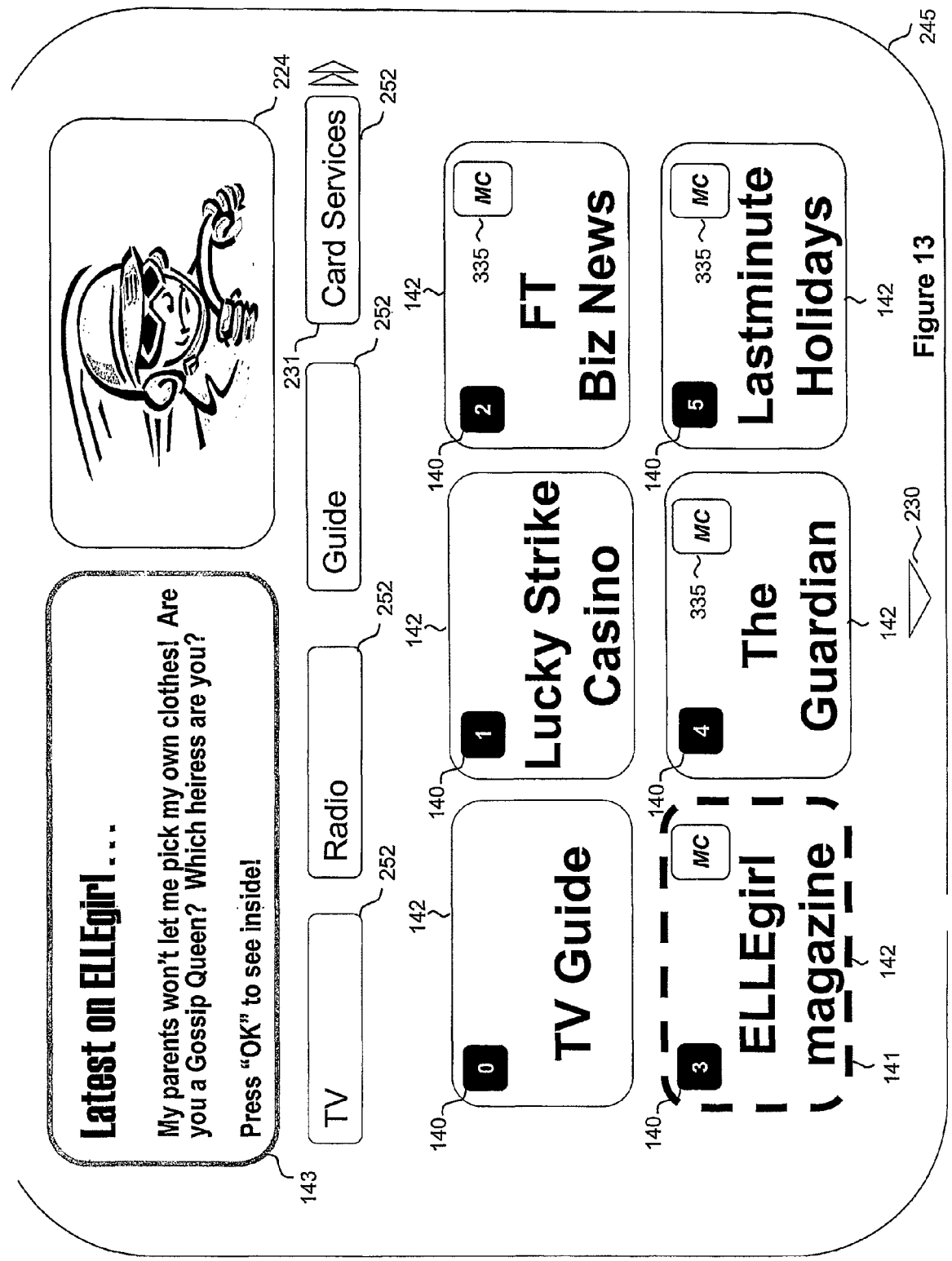
FIG. 13 shows the on-screen user interface displayed by the television apparatus when the user has requested to choose from a menu of interactive services.

The service operator may broadcast additional service content for reception by apparatus 109 for storage on memory cards. This provides a useful, convenient means whereby a user can extend the capability and usefulness of the apparatus during its lifetime. Users may press a service key 128 to leave full screen television viewing and cause a service menu 245 to be displayed as shown in FIG. 13. Preferably, the television channel viewed in full screen mode is displayed in reduced scale 224 within the service menu without interruption to the audio component. The service menu includes a plurality of cells 142, each of which corresponds to an interactive television service that is available to the user. When in this service menu 145, users can select and activate any one of the services displayed.

Each of cells 142 correspond to a service that has previously been selected by a user and downloaded to the apparatus and whose content is stored either in the canister 147 or on the non-volatile memory card 107. Each cell may enclose a distinctive feature such as a title, label or graphic that allows the service to be identified by the user. Each cell may further display an icon or label 335 to denote the physical source of the content of the service to which it corresponds. The icon 335 may be displayed inset within, or immediately adjacent to, the cell 142. Preferably, cells that correspond to services whose content items are stored to a removable memory card are marked with a card shaped icon 335.

One of the cells 141 is highlighted differently from the remaining cells 142, such as by using a different shading or border, in order to show to the user that the cell is in focus. The user may move the focus between cells by pressing the arrows keys 120 to cause the focus to move in the direction of the arrow key pressed until a desired cell is in focus. Pressing the OK key 121 activates and displays the service corresponding to it. Alternatively, the user may activate an item by pressing a number key 123 corresponding to a number label 140 displayed inset within or adjacent to the desired cell. A panel 143 that contains descriptive or promotional information relevant to the cell in focus 141 is displayed simultaneously with the cells 142. As the user moves focus between cells, the panel 143 is updated to include information pertinent to the new cell in focus. A scroll arrow 230 is displayed when more services can be reached than are displayed on the screen. Cells corresponding to these are reached by pressing the page up or down keys 126 according to the direction of the scroll arrow 230. The user may cause the apparatus to perform an action corresponding to an action cell 252 by pressing a handset key 124 whose colour corresponds to the cell's colour, and where the action is described by either a text label or a graphical icon inset within or immediately adjacent to the cell 252.

Figure 14:
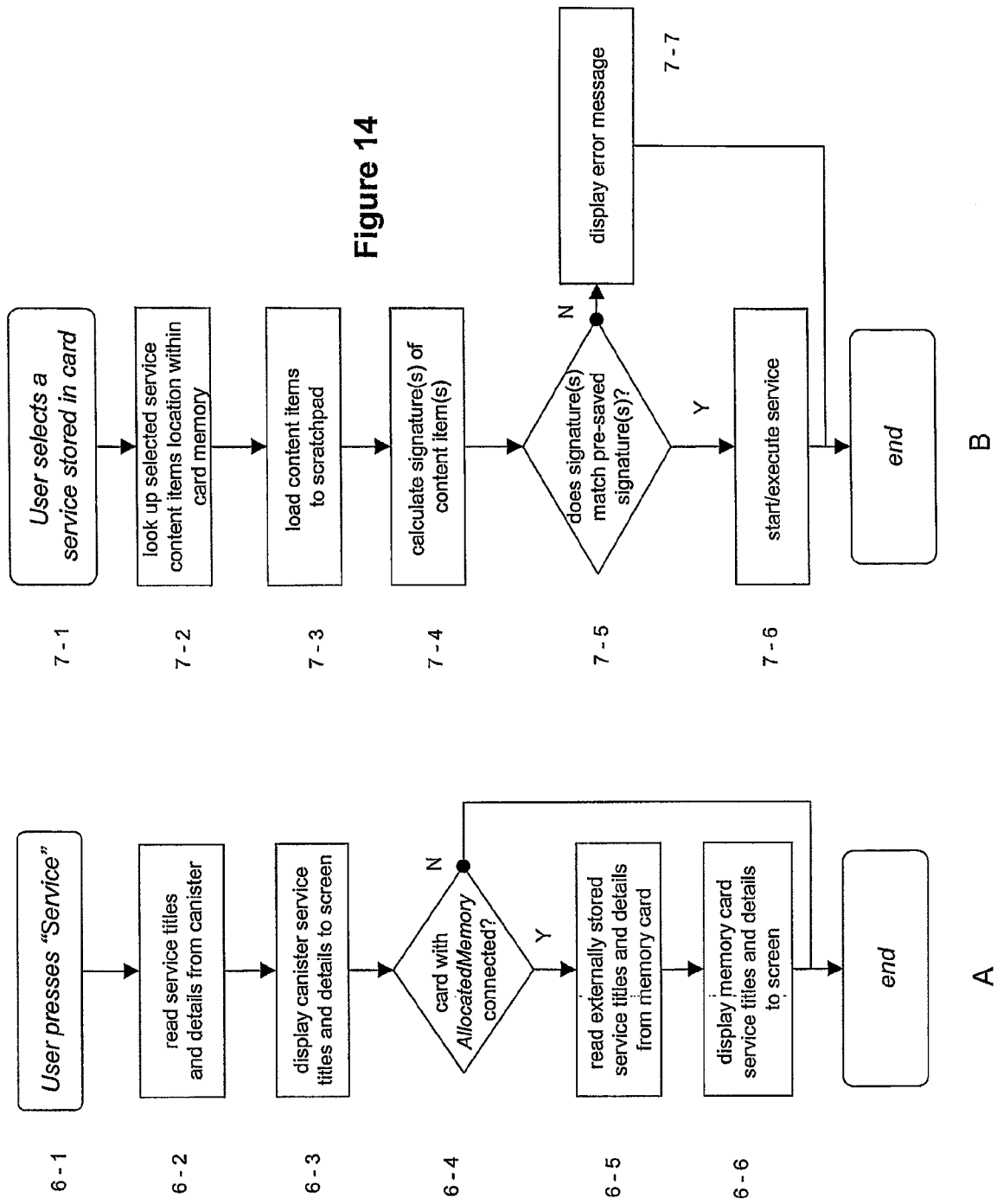
FIG. 14A shows the process employed by the television apparatus to display the on-screen user interface of FIG. 13.
FIG. 14B shows the shows the process employed by the television apparatus to invoke an interactive service selected by a user of the on-screen user interface of FIG. 13.

FIG. 14A shows the steps for generating the screen of FIG. 13. When the user presses a dedicated "Service" key 128 on the remote control handset (6-1), the apparatus reads the titles and properties associated with each service whose items are stored in the canister 147 (6-2) and displays them on the screen 245, presenting each title inset within a cell 142 (6-3). The apparatus next determines whether a memory card is attached by attempting to verify that the file Allocated-Memory exists and whether a non-zero amount of service memory 323 has been allocated to it (6-4). If so, the apparatus reads the properties for each service listed within the memory card's service properties areas 333 and looks within its internal flash (6-5) for an entitlement cookie 336 corresponding to each. Where both a service's properties 333 and its entitlement are found, the apparatus displays the service's Title to the screen 245 (6-6) inset within a cell 140 and marks the cell with an icon or highlight 335 to confirm that the source of the service's content items is an inserted memory card. The apparatus further displays the service's Description in a second notes area 143 responsive to the user's choice of cell to be placed in focus.

FIG. 14B shows the process for invoking an externally stored service from the screen of FIG. 13. Firstly, the user selects an externally stored service by pressing the "OK" key 121 when the cell corresponding to the service is in focus 141, or by pressing a numeric key 123 associated with that cell 141 (7-1). The apparatus looks up within the service properties 333 for the service's content item location(s) within the card service memory 323 (7-2) and copies those items from service memory (323) to scratchpad memory 148 (7-3). The apparatus generates digital signatures of the items (7-4) and compares these with signatures for their counterpart(s) in the executable signature block 330 within integral flash memory 152 (7-5). If all the pairs of signatures match the service is started (7-6), otherwise an error message is displayed (7-7).

Figure 15:
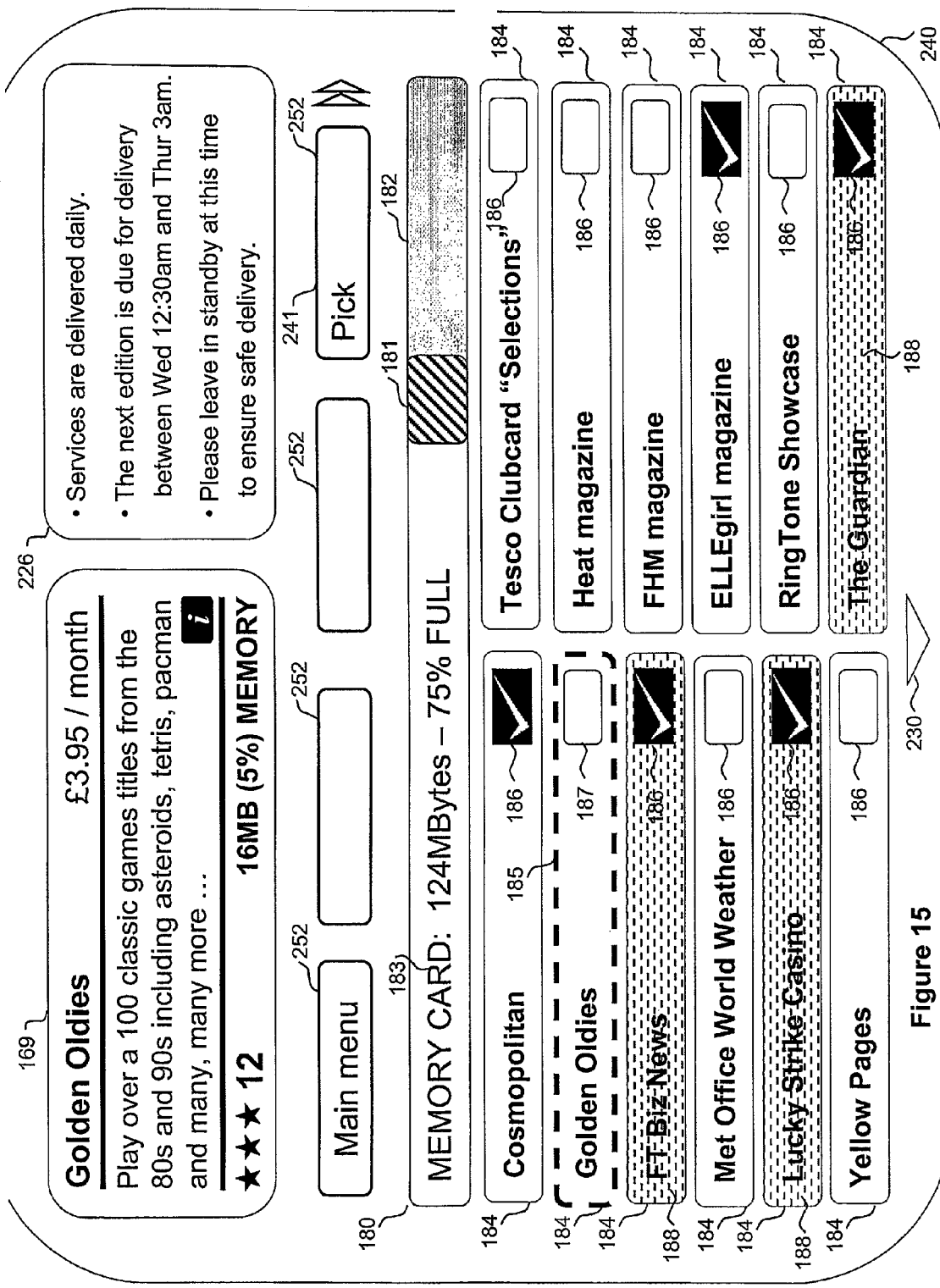
FIG. 15 shows the on-screen catalogue displayed by the television apparatus to allow the user to select which interactive television services containing card based content items he/she wants to receive.
Figure 16:
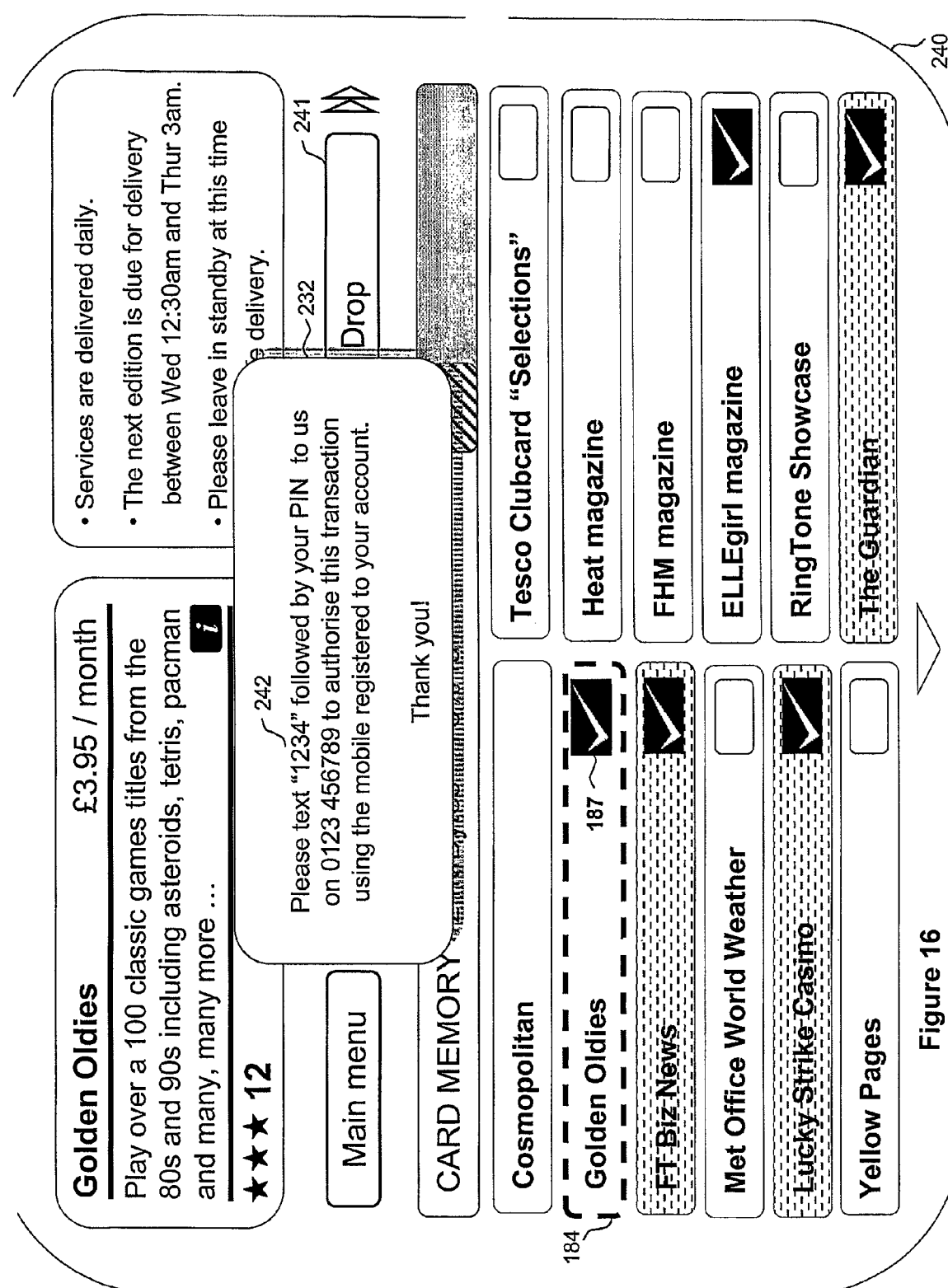
FIG. 16 shows the on-screen catalogue displayed by the television apparatus where a user has selected to receive a pay service.

A card services action cell 231 is included within the services menu of FIG. 13. The user may add/remove services to/from the service menu 245 by pressing a hot key 124 that corresponds to the action cell 231. This causes display of an on screen catalogue of services 240 whose contents items download to the memory card, as shown in FIG. 15. Once in this screen, a user may press arrow keys to navigate focus between cells 184 in a column or grid, in the same manner to that described for the service menu 245. Each cell 184 corresponds to an item of content available for downloading to the memory card and later displayed by the apparatus. Each cell 184 is labelled with a content item's name or title (e.g. "Met Office World Weather") or some other identification such as a logo. Each cell 184 also has a tick box 186 that contains a tick or some other symbol or label to denote whether its service is selected for downloading. The catalogue further informs the user of the services for which the content items are stored on the inserted memory card in up to date form. This is done by highlighting their corresponding cells differently (such as shown in FIG. 15 by the shaded cell areas 188) compared to cells of services that are not up to date or stored to the card. Preferably this method of highlighting depicts up to date services with cell areas shaded in one colour, whereas the areas corresponding to out of date services are depicted in another colour. Either a "pick" or "drop" label 241 is displayed according to whether the focussed cell's box 187 is clear or contains a tick. A user may toggle between selection and de-selection of a service by pressing the hot key 124 corresponding to 241, as shown in FIG. 16.

A user needs sufficient information on screen to decide quickly which services to select from the catalogue 240. For this reason, the catalogue's display is organised to provide all pertinent information on a single screen. A horizontal bar 180 displays descriptive text 183 to indicate how much card memory has been allocated to a service. A proportion 181 of bar 180 is sized in width according to the memory requirement of the service corresponding to the cell currently in focus 185 as a proportion of stored service memory 323 on the card. A further proportion 182 of bar 180 is sized in width according to the total amount of unallocated externally stored services memory 323, excluding that corresponding to the cell in focus 185, as a proportion of the total amount of stored service memory 323 on the card. An information box 169 is displayed in response to the currently focussed cell 185 and contains its corresponding service's title, pricing information, a description of the service's content, editorial star rating, parental rating and memory requirement. A second information box 226, not responsive to the focussed cell 185, displays general user information and help tips.

Figure 17:
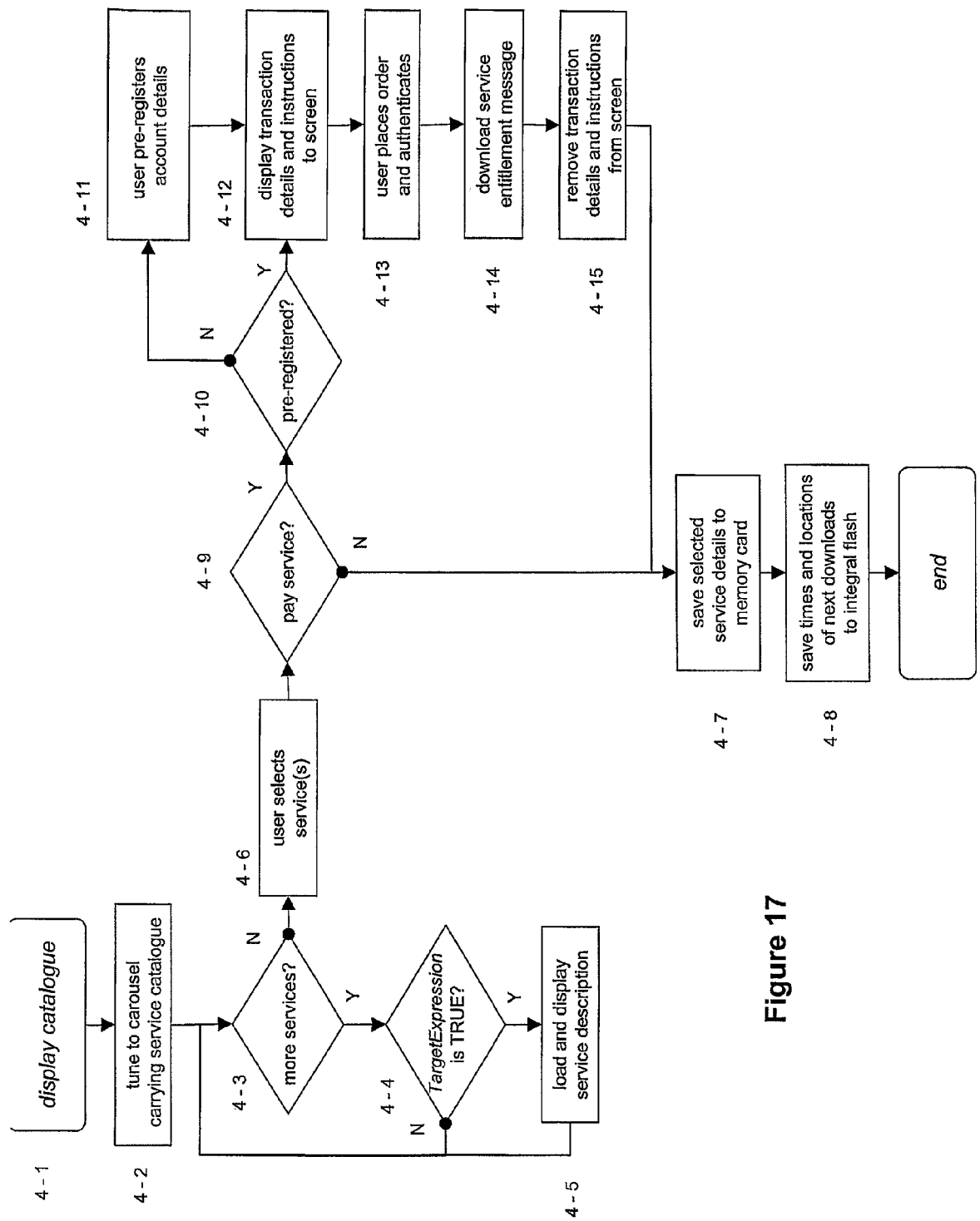
FIG. 17 shows the process employed by the apparatus to download, manage and display the service catalogue.

FIG. 17 is a flow diagram showing how the service catalogue is downloaded to the apparatus, and how the user selects services for downloading. As noted previously, the service catalogue information is broadcast as part of the data stream of FIG. 9. The catalogue data contains an identifier, version number, scheduled broadcast time, and data stream and transport stream/multiplex identifiers for each service item to be broadcast. The data structure downloaded for the catalogue includes a payload identifier to show the identity of the payload to follow as belonging to the service catalogue (Payload); the number of services referred to in the catalogue (NumberServices); target expressions to determine whether the service is suitable for downloading to the apparatus, expressed as a Boolean expression of parameters and variables previously evaluated in each apparatus (TargetExpression). If the expression is evaluated as TRUE then the service corresponding to the properties to follow may be displayed on screen for selection by a user; the service's identifier (ServiceId), title, (ServiceTitle) and text description (Description); a logical flag, PayFlag, to signify whether the service is a pay service; the service's memory requirement when stored in flash memory (FlashMemory Requirement), i.e. the maximum sum of the memory sizes of all the content items for a given service; each of the content item identities (ContentItemId) and versions (ContentItem Version) for each service; time, date (TimeDate), transport stream (TransportStreamId) and packet identifier (PacketId) for the next, one or more broadcasts. The catalogue is typically a kilobyte in size and broadcast as a continuous, repeating carousel of low bandwidth 171 relative to that employed to broadcast the content items 173. To permit the apparatus to configure themselves promptly from power up, the catalogue is broadcast at a high frequency, typically once per minute, compared to the frequency of broadcast of the individually content items listed within (typically every 8 hours).

On receiving a user input request to display the catalogue (4-1) the apparatus programs the tuner 300 and de-multiplexer 301 to receive the data stream 171 from the service operator containing catalogue information (4-2). The apparatus downloads the service catalogue data 171 to scratchpad DRAM 148. For each service (4-3) in the catalogue the apparatus evaluates a Boolean expression, TargetExpression, to determine whether the service is compatible with the apparatus's memory resources, CPU speed and graphics capabilities and can be downloaded (4-4). Where a service is compatible, the apparatus displays the catalogue details (ServiceTitle, Description, TimeDate) to the screen (4-5) as shown in FIG. 15. If a service entitlement cookie 336 is found for the service and its corresponding identity 333 is found on the memory card, a tick marker 186 is displayed within its cell 184 to show that it has previously been marked for downloading.

The user may further select services corresponding to unmarked cells (187) for downloading from the on-screen catalogue (4-6), causing them to be marked as follows: If the user selects a pay service (4-9) the apparatus determines whether the user has previously pre-registered an account with the operator (4-10) by checking within the file system for the existence of an apparatus cookie 144 containing registration parameters, hi the embodiment described, these parameters include the user's account number and PIN. If the cookie is found (4-10), the apparatus displays a pop-up message 232 over the catalogue menu display 240 containing instructions for the user to communicate the service's identity 242 and to authenticate him/herself using the PIN to the service operator (4-12). In the embodiment described, the user communicates the order details and PIN to the service operator (4-13) within a mobile telephone 111 text message that is transmitted by the user across the mobile telephone network 108 to the operator's request decoder 134. However, where a network transceiver 119 is connected to the apparatus, the information is preferably communicated to the service operator 100 via the network transceiver, internet access point 139 and the Internet 156.

The service operator processes the order, authenticates the user and transmits an entitlement message addressed to the apparatus via the broadcast infrastructure 110. The apparatus receives the message, filters against its own its address and stores it as a service entitlement cookie 336 (4-14), redraws marker 187 as a ticked marker 186 and removes instructions 232 (4-15) or replaces the instructions 232 with temporary display of an acknowledgement. The identity (ServiceId) of the selected service is saved to non-volatile card memory 333 (see FIG. 10) for later reference by the apparatus during downloading (4-7). The download times (TimeDate) and locations (TransportStreamId and PacketId) are written to integral flash 334 (4-8).

Some services may require a payment to be made by the user to the service operator 100 before they may be downloaded to the apparatus and accessed. Account details are pre-registered by a user with the service operator for this purpose as shown by step (4-11) in FIG. 16. In the preferred implementation of step (4-11), the apparatus displays its machine address and a message directing the user to open an account by displaying a universal resource locator (URL) corresponding to a world wide web site accessible via the Internet, where the user may communicate to the operator the apparatus address, his/her postal address, payment details, telephone number 111 and PIN. When a valid account is formed, the operator broadcasts the account's registration details to the apparatus' address for downloading as a service entitlement cookie 336.

To minimise apparatus power consumption, each service's content items are broadcast a small number of times each day in bursts 173 of high data rate when the apparatus is not in use, as shown in FIG. 9. The times and locations of these bursts (TimeDate, TransportStreamId and PacketId) are downloaded from the service catalogue data stream 171 and stored within the apparatus in non-volatile memory 334. When the apparatus's tuner 300 and de-multiplexer 301 are not in use (for example, because the apparatus is in low power standby or because the apparatus has determined that it is not attended by a user due to a minimum time period since the last command from the remote control 117 having been exceeded), the apparatus reads the burst time and location data 334 to determine when the next service broadcast is scheduled to commence. At a short interval before said time, the apparatus programs the tuner 300 and de-multiplexer 301 to receive the scheduled service content items 295.

FIG. 18 shows the process for downloading and processing each object. Content items may comprise content 292, application software 293, data or some combination thereof. Each item may be broadcast as a plurality of data objects, where each object contains a header that contains a logical expression that is a function of the apparatus' parameters 143. If the expression is evaluated (5-2) as TRUE for a given apparatus, then the object is downloaded to scratchpad memory 148 (5-3). For example, an object with the expression "ScratchPadMemory>2048 AND (Address>0x10000)" would be downloaded if the apparatus has more than 2,048 kilobytes of scratchpad memory and has an address exceeding 0x10000. The apparatus verifies that a memory card with a service memory allocation 323 is connected (5-4) and that the object's service is listed in the card's stored service properties 333 (5-5).

All executable objects require authentication that they are bona fide objects broadcast by the service operator prior to loading and execution in order to protect against viruses being loaded and executed from the memory card. If the object's header indicates that the object is an executable (5-6), the apparatus generates a digital signature as a mathematical hash function of the object and saves the signature in the executable signatures area within its integral non-volatile memory 330 (5-7). Each object is processed according to its type (5-8) so that objects containing encryption flags are decrypted prior to storage, and executable objects are translated from a generic instruction set to the instruction set employed by the apparatus's CPU 303, and compiled and linked. The processed object is written to the service memory 323 within the card 107 (5-9). The process continues until all objects have been downloaded to the memory card (5-10).

By storing at least some interactive services data on the memory card, the present invention extends the range of interactive television functions potentially available to users, without increasing the internal hardware requirements of the user's television apparatus. This is advantageous.

A skilled person will appreciate that variations of the disclosed arrangements are possible without departing from the invention. For example, many of the functional elements described with reference to FIG. 5 may be combined on a single large-scale integration (LSI) silicon component such as STMicroelectronics' STi5100 chipset, in the case where the apparatus is a digital television receiver all the functions described with reference to FIG. 5 are resident within the television chassis. Accordingly the above description of the specific embodiment is made by way of example only and not for the purposes of limitation. It will be clear to the skilled person that minor modifications may be made without significant changes to the operation described.

That which is claimed:

1. An interactive television system comprising:
   means for receiving television signals;
   means for receiving data for implementing an interactive television service, the interactive television service data comprising content items;
   means for storing the content items, including content version information therefor, on a removable, non-volatile memory; and means for automatically copying to the removable memory information in an internal memory, so that the removable memory acts as a backup, wherein the system is adapted to download time, date and service version information from a broadcast source, read the content version information of the content items stored on the removable memory to determine whether the content items are expired, and restore the content items from the removable memory to the internal memory if said content items are not expired.

2. A system as claimed in claim 1 comprising means for generating a user interface using information stored on the removable memory.

3. A system as claimed in claim 2 comprising means for merging information in both the internal memory and the removable memory to provide a user interface that has user selectable interactive services that are accessible via information in both the internal and external memories.

4. A system as claimed in claim 3 comprising means for marking interactive services on the interface to indicate that they are available via the removable memory.

5. A system as claimed in claim 2 wherein the user interface is operable to allow access to user activatable interactive services.

6. A system as claimed in claim 1 comprising means for prompting a user to indicate whether interactive television service information is to be stored on the removable memory.

7. A system as claimed in claim 6 wherein the prompting means are responsive to connection of a removable memory device.

8. A system as claimed in claim 1 comprising means for presenting a services catalogue to a user, the catalogue including a plurality of selectable services.

9. A system as claimed in claim 8 wherein the services catalogue includes services that are designated as being available for storing on the removable memory.

10. A system as claimed in claim 8 including means for identifying any service already selected by a user.

11. A system as claimed in claim 8 including means for identifying any service that has been selected and authorised for use by the user.

12. A system as claimed in claim 8 including means for presenting additional information relating to one of the services in response to a user input, such as highlighting one of the services.

13. A system as claimed in claim 12 wherein the additional information is provided in a dedicated area of the screen, preferably separate from the services listings.

14. A system as claimed in claim 1 adapted to prompt a user when the removable non-volatile memory is connected on whether to allocate a portion of the non-volatile memory for the purpose of backing up data, and to allocate backup space within the file system of the non-volatile memory, in the event that a confirmation is received from the user that an allocation is to be made.

15. A system as claimed in claim 14 adapted so that a user is not prompted a second time when the card is next inserted, in the event that storage on the removable memory is not required.

16. A system as claimed in claim 1 wherein the removable memory is usable with multiple apparatus for the purpose of storing service content for the multiple apparatus.

17. A system as claimed in claim 1 adapted to generate a digital signature for data stored on the removable memory; compare this with a signature in the internal memory and start the service if the signatures match.

18. A system as claimed in claim 1 adapted to receive data via the internet.

19. A system as claimed in claim 1 wherein the internal memory is volatile, such as dynamic random access memory (DRAM).

20. A method for providing interactive television services to a user comprising:

downloading interactive television service information to a television system, the interactive television service information comprising content items;

storing the content items, including content version information therefor, on a removable non-volatile memory device;

automatically copying to the removable memory information in an internal memory, so that the removable memory acts as a backup, and using the stored content items to provide interactive services, wherein the system downloads time, date and service version information from a broadcast source, reads the content version information for the content items stored on the removable memory to determine whether the content items are expired, and restores the content items from the removable memory to the internal memory if they are not expired.

21. A method as claimed in claim 20 comprising generating a user interface using information stored on the removable memory, such as service entitlement information.

22. A method as claimed in claim 21 comprising generating the user interface using information in both an internal memory and the removable memory.

23. A method as claimed in claim 21 wherein the user interface is operable to allow access to user activatable interactive services.

24. A method as claimed in claim 21 comprising marking interactive services on the interface to indicate that they are available via the removable memory.

25. A method as claimed in claim 20 comprising prompting a user to indicate whether interactive television service information is to be stored on the removable memory.

26. A method as claimed in claim 25 wherein the step of prompting is responsive to connection of a removable memory device.

27. A method as claimed in claim 20 comprising presenting a services catalogue to a user, the catalogue including a plurality of selectable services.

28. A method as claimed in claim 27 wherein the services catalogue includes services that are available for storing on the removable memory.

29. A method as claimed in claim 27 including identifying within the catalogue any service already selected by a user.

30. A method as claimed in claim 27 including identifying within the catalogue any service that has been selected and authorised for use by the user.

31. A method as claimed in claim 27 including means for presenting additional information relating to one of the services in response to a user input, such as highlighting one of the services.

32. A method as claimed in claim 31 comprising presenting the additional information in a dedicated area of the screen, preferably separate from the services listings.

* * * * *